US012699798B2

(12) United States Patent
Phillips et al.

(10) Patent No.: US 12,699,798 B2
(45) Date of Patent: Aug. 4, 2026

(54) METHOD AND SYSTEM TO IMPLEMENT PRIVACY-PRESERVING COLLABORATIVE SEMANTIC MAPPING

(71) Applicant: Telefonaktiebolaget LM Ericsson (publ), Stockholm (SE)

(72) Inventors: Gregoire Phillips, Sunnyvale, CA (US); James Gary Choncholas, Atlanta, GA (US); Héctor Caltenco, Oxie (SE); Ali El Essaili, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/111,609

(22) PCT Filed: Sep. 16, 2022

(86) PCT No.: PCT/IB2022/058790
§ 371 (c)(1),
(2) Date: Mar. 13, 2025

(87) PCT Pub. No.: WO2024/057076
PCT Pub. Date: Mar. 21, 2024

(65) Prior Publication Data
US 2025/0258950 A1     Aug. 14, 2025

(51) Int. Cl.
*G06F 21/62* (2013.01)
(52) U.S. Cl.
CPC ............................... *G06F 21/6218* (2013.01)
(58) Field of Classification Search
CPC ................................................. G06F 21/6218
(Continued)

(56) References Cited

U.S. PATENT DOCUMENTS 11,599,655 B1 * 3/2023 Meng ..................... H04L 9/3242
12,094,018 B1 * 9/2024 O'Malley .............. G06N 20/00
(Continued)

FOREIGN PATENT DOCUMENTS

CN          102970326 A  *  3/2013
WO     WO-2016100942 A1 *  6/2016    ......... G07F 17/3276
(Continued)

OTHER PUBLICATIONS

Li, Qi, Zehong Cao, Muhammad Tanveer, Hari Mohan Pandey, and Chen Wang. "A semantic collaboration method based on uniform knowledge graph." IEEE Internet of Things Journal 7, No. 5 (2019): 4473-4484. (Year: 2019).*
(Continued)

*Primary Examiner* — Luu T Pham
*Assistant Examiner* — Walter J Malinowski
(74) *Attorney, Agent, or Firm* — NICHOLSON DE VOS WEBSTER & ELLIOTT LLP

(57) ABSTRACT

Embodiments include methods, electronic devices, storage medium, and instructions to perform privacy-preserving collaborative semantic mapping. In one embodiment, a method comprises: transmitting a request from a first electronic device to participate in a semantic mapping process, the request indicating a location for which the semantic mapping process is to be performed; receiving a response to the request, indicating a second electronic device that matches the request to perform the semantic mapping process; identifying, using a private set intersection protocol, from semantic mapping data of the first electronic device, intersecting semantic mapping data of the first electronic device that intersects with semantic mapping data of the second electronic device; and causing performance of the semantic mapping process based on the identification, wherein sources of intersecting semantic mapping data of
(Continued)

500

Transmit, by a first electronic device, a request to participate in a semantic mapping process, the request indicating a location for which the shared semantic mapping process is to be performed. 502

Receive a response to the request, indicating a second electronic device that matches the request to perform the semantic mapping process. 504

Identify, using a private set intersection protocol, from semantic mapping data of the first electronic device, intersecting semantic mapping data of the first electronic device that intersects with semantic mapping data of the second electronic device. 506

Cause performance of the semantic mapping process based on the identification, wherein sources of intersecting semantic mapping data of the first and second electronic devices are to be known to both participating electronic devices of the semantic mapping process. 508

Cause performance of the semantic mapping process based on at least a portion of semantic mapping data from the first and second electronic devices that are not intersecting, and where sources of the portion of the semantic mapping data are not exposed to each other electronic devices. 510 the first and second electronic devices are to be known to both participating electronic devices of the semantic mapping process.

20 Claims, 11 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 2006/0136489 | A1* | 6/2006 | Thome | G06Q 10/10 |
| 2008/0109439 | A1* | 5/2008 | Wu | G06F 16/243 |
| | | | | 707/999.009 |
| 2010/0211741 | A1* | 8/2010 | Soni | G06F 16/25 |
| | | | | 715/244 |
| 2013/0157670 | A1* | 6/2013 | Koskela | H04W 74/0833 |
| | | | | 455/450 |
| 2013/0283338 | A1* | 10/2013 | Kumar | H04L 63/20 |
| | | | | 726/1 |
| 2015/0149763 | A1* | 5/2015 | Kamara | H04W 4/02 |
| | | | | 713/150 |
| 2016/0124936 | A1* | 5/2016 | Wang | G06F 8/427 |
| | | | | 704/9 |
| 2017/0147527 | A1* | 5/2017 | Chandrasekaran | H04L 67/10 |
| 2019/0132132 | A1* | 5/2019 | Kersting | H04L 9/3242 |
| 2019/0356849 | A1* | 11/2019 | Sapienza | H04N 23/65 |
| 2021/0268652 | A1* | 9/2021 | Narayana | G01C 21/20 |
| 2021/0404813 | A1* | 12/2021 | Fasola | G01S 17/931 |
| 2022/0004654 | A1* | 1/2022 | Patel | G06F 21/602 |
| 2022/0076052 | A1* | 3/2022 | Zhang | G06V 30/40 |
| 2022/0138849 | A1* | 5/2022 | Henson | G06Q 40/04 |
| | | | | 705/37 |
| 2022/0214170 | A1* | 7/2022 | Singh | G01C 21/005 |
| 2022/0287530 | A1* | 9/2022 | Xi | G06V 20/64 |
| 2022/0343165 | A1* | 10/2022 | Hu | G06F 9/4806 |
| 2022/0343747 | A1* | 10/2022 | Ju | G08B 21/0277 |
| 2023/0098437 | A1* | 3/2023 | Li | G06T 7/30 |
| | | | | 382/299 |
| 2023/0306000 | A1* | 9/2023 | Greehy | G06F 16/176 |
| 2024/0119697 | A1* | 4/2024 | Duckworth | G06V 10/778 |
| 2024/0361149 | A1* | 10/2024 | Sharifi | G01C 21/3438 |

FOREIGN PATENT DOCUMENTS

| | | | | |
|---|---|---|---|---|
| WO | WO-2019221582 A1 * | 11/2019 | | G01S 3/781 |
| WO | 2023/105268 A1 | 6/2023 | | |
| WO | WO-2023204816 A1 * | 10/2023 | | H04W 4/021 |
| WO | WO-2024057076 A1 * | 3/2024 | | G06F 21/62 |

OTHER PUBLICATIONS

Sheldon, Frederick T., Mark T. Elmore, and Thomas E. Potok. "An ontology-based software agent system case study." In Proceedings ITCC 2003. International Conference on Information Technology: Coding and Computing, pp. 500-506. IEEE, 2003. (Year: 2003).*

Seghrouchni, "Ambient intelligence applications: Introducing the campus framework." In 13th IEEE International Conference on Engineering of Complex Computer Systems (iceccs 2008), pp. 165-174. IEEE, 2008. (Year: 2008).*

Chen et al., "Federated Zero-Shot Learning for Visual Recognition", arXiv:2209.01994v1, Sep. 5, 2022, 13 pages.

Ignatenko et al., "AU2EU: Privacy-Preserving Matching of DNA Sequences*", WISTP 2014, LNCS 8501, 2014, pp. 180-189.

Tian et al., "Kimera-Multi: Robust, Distributed, Dense Metric-Semantic SLAM for Multi-Robot Systems", IEEE Transactions on Robotics (T-RO), arXiv:2106.14386v2, Dec. 17, 2021, pp. 1-18.

Yue et al., "A Hierarchical Framework for Collaborative Probabilistic Semantic Mapping", 2020 IEEE International Conference on Robotics and Automation (ICRA), May 31-Aug. 31, 2020, pp. 9659-9665.

Yue et al., "Collaborative Semantic Understanding and Mapping Framework for Autonomous Systems", IEEE/ASME Transactions on Mechatronics, vol. 26, No. 2, Apr. 2021, pp. 978-989.

Zhang et al., "Robust Semantic Map Matching Algorithm Based on Probabilistic Registration Model", 2021 IEEE International Conference on Robotics and Automation (ICRA 2021), May 31-Jun. 4, 2021, pp. 5289-5295.

* cited by examiner

Communication Network 100

Figure 2:
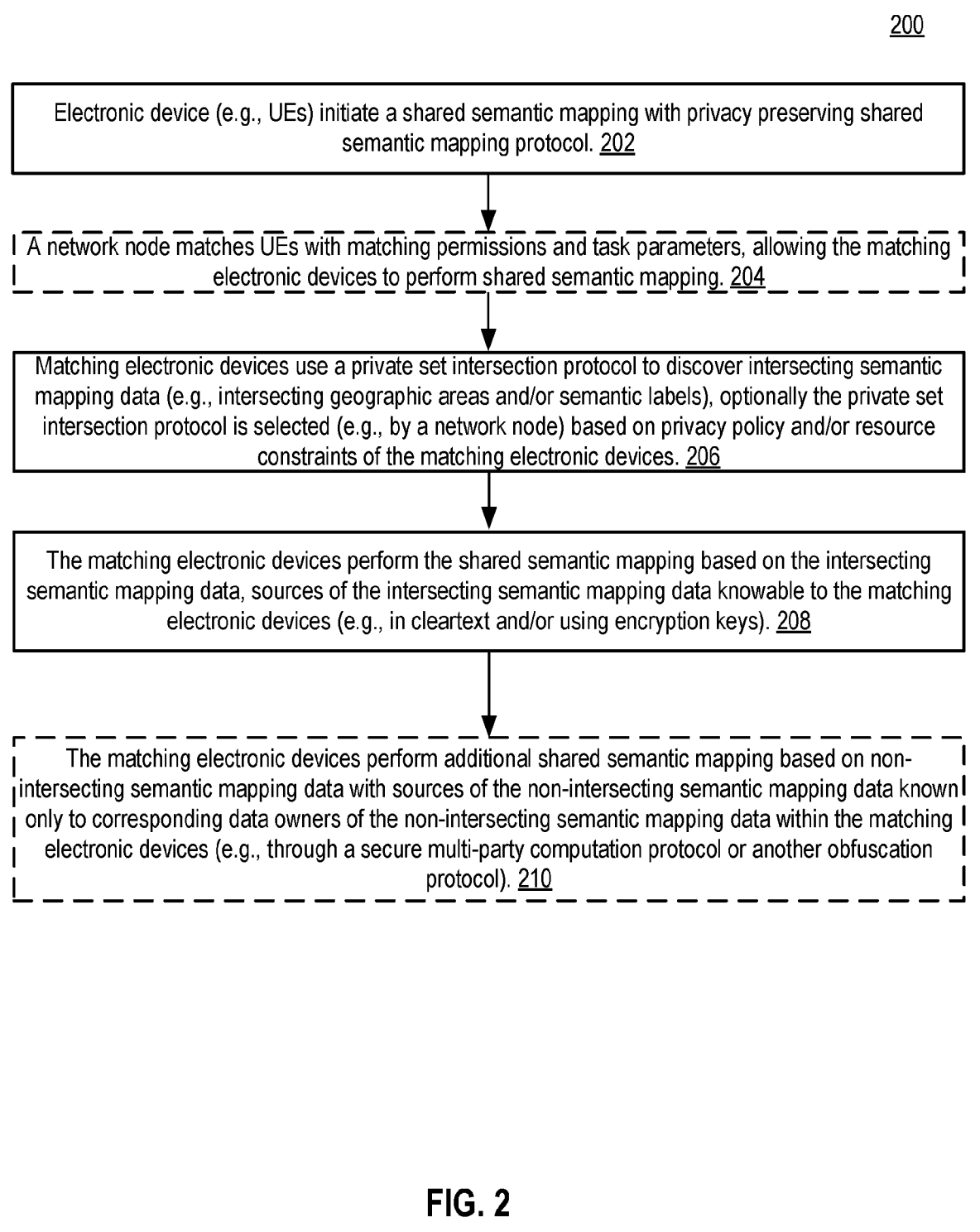

200

Electronic device (e.g., UEs) initiate a shared semantic mapping with privacy preserving shared semantic mapping protocol. 202

A network node matches UEs with matching permissions and task parameters, allowing the matching electronic devices to perform shared semantic mapping. 204

Matching electronic devices use a private set intersection protocol to discover intersecting semantic mapping data (e.g., intersecting geographic areas and/or semantic labels), optionally the private set intersection protocol is selected (e.g., by a network node) based on privacy policy and/or resource constraints of the matching electronic devices. 206

The matching electronic devices perform the shared semantic mapping based on the intersecting semantic mapping data, sources of the intersecting semantic mapping data knowable to the matching electronic devices (e.g., in cleartext and/or using encryption keys). 208

The matching electronic devices perform additional shared semantic mapping based on non-intersecting semantic mapping data with sources of the non-intersecting semantic mapping data known only to corresponding data owners of the non-intersecting semantic mapping data within the matching electronic devices (e.g., through a secure multi-party computation protocol or another obfuscation protocol). 210

Figure 5:
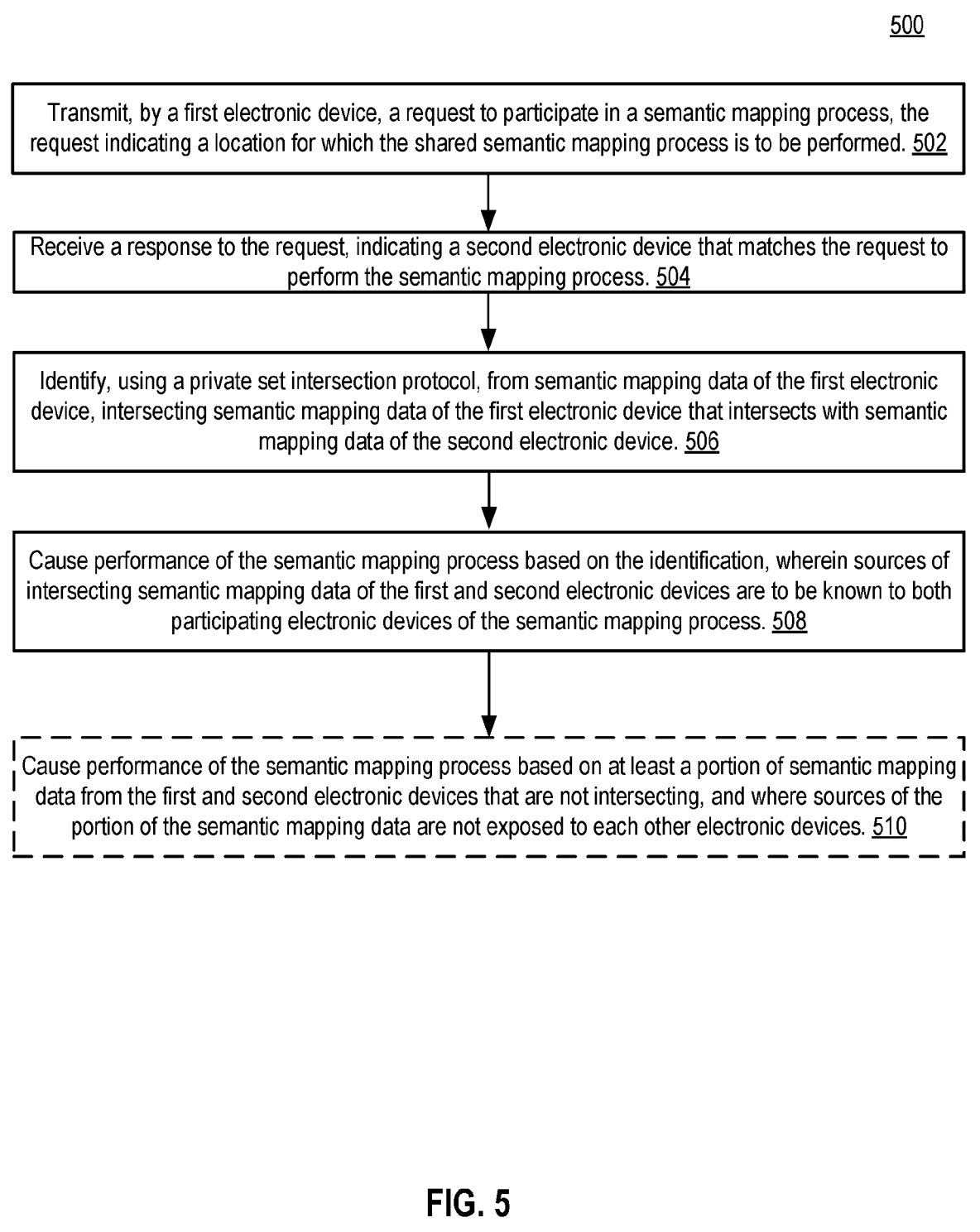

Transmit, by a first electronic device, a request to participate in a semantic mapping process, the request indicating a location for which the shared semantic mapping process is to be performed. 502

Receive a response to the request, indicating a second electronic device that matches the request to perform the semantic mapping process. 504

Identify, using a private set intersection protocol, from semantic mapping data of the first electronic device, intersecting semantic mapping data of the first electronic device that intersects with semantic mapping data of the second electronic device. 506

Cause performance of the semantic mapping process based on the identification, wherein sources of intersecting semantic mapping data of the first and second electronic devices are to be known to both participating electronic devices of the semantic mapping process. 508

Cause performance of the semantic mapping process based on at least a portion of semantic mapping data from the first and second electronic devices that are not intersecting, and where sources of the portion of the semantic mapping data are not exposed to each other electronic devices. 510

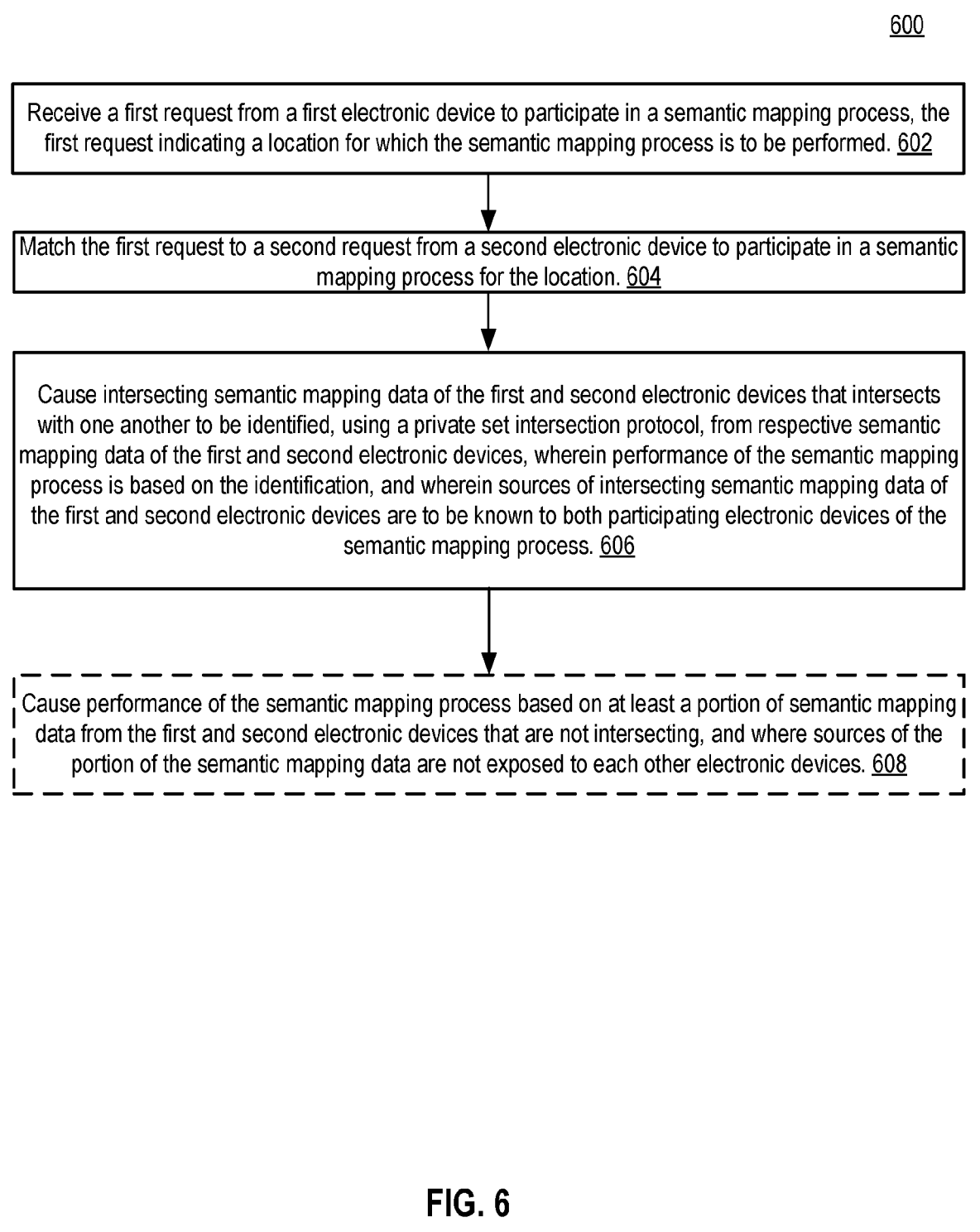

Receive a first request from a first electronic device to participate in a semantic mapping process, the first request indicating a location for which the semantic mapping process is to be performed. 602

↓

Match the first request to a second request from a second electronic device to participate in a semantic mapping process for the location. 604

↓

Cause intersecting semantic mapping data of the first and second electronic devices that intersects with one another to be identified, using a private set intersection protocol, from respective semantic mapping data of the first and second electronic devices, wherein performance of the semantic mapping process is based on the identification, and wherein sources of intersecting semantic mapping data of the first and second electronic devices are to be known to both participating electronic devices of the semantic mapping process. 606

↓

Cause performance of the semantic mapping process based on at least a portion of semantic mapping data from the first and second electronic devices that are not intersecting, and where sources of the portion of the semantic mapping data are not exposed to each other electronic devices. 608

FIG. 6

METHOD AND SYSTEM TO IMPLEMENT PRIVACY-PRESERVING COLLABORATIVE SEMANTIC MAPPING

CROSS-REFERENCE TO RELATED APPLICATIONS

This application is a National stage of International Application No. PCT/IB2022/058790, filed Sep. 16, 2022, which is hereby incorporated by reference.

TECHNICAL FIELD

Embodiments of the invention relate to the field of computing; and more specifically, to implementing privacy-preserving collaborative semantic mapping.

BACKGROUND ART

Using one or more sensors, localization and mapping algorithms may construct or update a map of an environment, and such localization and mapping algorithms are used in applications such as extended reality (XR) and autonomous robotics. Implementing localization and mapping is often referred to as a simultaneous localization and mapping (SLAM) process/operation/pipeline. Semantic mapping is the process through which semantic (i.e., meaning making) information is assigned to geometric points in a mapping of an environment. For example, an autonomous vehicle may use on-vehicle sensor and compute to generate a semantic map of its environment in which it assigns the semantic labels such as "road," "lane line," "sidewalk," "pedestrian," and "vehicle" to relevant geometric features corresponding to its estimation of their meaning in its environment. Likewise, a device generating or updating a semantic map of a factory floor may assign the labels "box," "worker," and "walking path," based on the relevant semantic labels assigned to this environment for its function.

Collaborative semantic mapping (also referred to as "shared" semantic mapping and the two terms are used interchangeably herein) is the process through which two or more electronic devices construct a global shared semantic map based on either individual device-level semantic map inputs or individual device-level semantic and/or mapping inputs. For example, collaborative processes may be performed in which two or more devices share semantic maps of a global environment meant to generate or update a shared global semantic map. Collaborative semantic mapping may occur within a SLAM pipeline as a component assigning semantic labels to mesh models of environments.

Secure multi-party computation (MPC) is a field of cryptography that seeks to allow two or more parties to securely perform operations on confidential data without revealing any features of that data to collaborators. Secure MPC is desirable in collaborative semantic mapping as it preserves the privacy of the two or more devices that are engaged in construction of a global shared semantic map.

Yet using secure MPC efficiently remains challenging in collaborative semantic mapping. For example, when collaborative semantic mapping occurs in environments in which one or more devices require private inputs for constructing, updating, or performing operations on a shared semantic map, that private information may be leaked to non-trusted parties and renders the collaborative mapping process untrustworthy as a result. On the other hand, secure MPC takes significant bandwidth/computation/storage resources to operate. For example, when the application is collaborative semantic mapping between two autonomous vehicles, a large communication bandwidth needs to be dedicated to encryption and authentication between the participants, and each participant needs to dedicate significant computation and storage for the task as well.

SUMMARY OF THE INVENTION

Embodiments include methods to perform privacy-preserving collaborative semantic mapping. In one embodiment, a method to be implemented in a first electronic device of a network comprises: transmitting a request to participate in a semantic mapping process, the request indicating a location for which the semantic mapping process is to be performed; receiving a response to the request, indicating a second electronic device that matches the request to perform the semantic mapping process; identifying, using a private set intersection protocol, from semantic mapping data of the first electronic device, intersecting semantic mapping data of the first electronic device that intersects with semantic mapping data of the second electronic device; and causing performance of the semantic mapping process based on the identification, wherein sources of intersecting semantic mapping data of the first and second electronic devices are to be known to both participating electronic devices of the semantic mapping process.

In another embodiment, a method to be implemented in an electronic device of a network comprises: receiving a first request from a first electronic device to participate in a semantic mapping process, the first request indicating a location for which the semantic mapping process is to be performed; matching the first request to a second request from a second electronic device to participate in a semantic mapping process for the location; causing intersecting semantic mapping data of the first and second electronic devices that intersects with one another to be identified, using a private set intersection protocol, from respective semantic mapping data of the first and second electronic devices, wherein performance of the semantic mapping process is based on the identification, and wherein sources of intersecting semantic mapping data of the first and second electronic devices are to be known to both participating electronic devices of the semantic mapping process.

Embodiments include electronic devices to perform privacy-preserving collaborative semantic mapping. In one embodiment, an electronic device comprises a processor and machine-readable storage medium that provides instructions that, when executed by the processor, are capable of causing the processor to perform: transmitting a request to participate in a semantic mapping process from a first electronic device, the request indicating a location for which the semantic mapping process is to be performed; receiving a response to the request, indicating a second electronic device that matches the request to perform the semantic mapping process; identifying, using a private set intersection protocol, from semantic mapping data of the first electronic device, intersecting semantic mapping data of the first electronic device that intersects with semantic mapping data of the second electronic device; and causing performance of the semantic mapping process based on the identification, wherein sources of intersecting semantic mapping data of the first and second electronic devices are to be known to both participating electronic devices of the semantic mapping process.

Embodiments include network nodes to perform privacy-preserving collaborative semantic mapping In one embodiment, a network node comprises a processor and machine-readable storage medium that provides instructions that, when executed by the processor, are capable of causing the processor to perform: receiving a first request from a first electronic device to participate in a semantic mapping process, the first request indicating a location for which the semantic mapping process is to be performed; matching the first request to a second request from a second electronic device to participate in a semantic mapping process for the location; causing intersecting semantic mapping data of the first and second electronic devices that intersects with one another to be identified, using a private set intersection protocol, from respective semantic mapping data of the first and second electronic devices, wherein performance of the semantic mapping process is based on the identification, and wherein sources of intersecting semantic mapping data of the first and second electronic devices are to be known to both participating electronic devices of the semantic mapping process.

Embodiments include machine-readable storage media to perform privacy-preserving collaborative semantic mapping. In one embodiment, a machine-readable storage medium stores instructions which, when executed by a processor, are capable of causing the processor to perform: transmitting a request to participate in a semantic mapping process, the request indicating a location for which the semantic mapping process is to be performed; receiving a response to the request, indicating a second electronic device that matches the request to perform the semantic mapping process; identifying, using a private set intersection protocol, from semantic mapping data of the first electronic device, intersecting semantic mapping data of the first electronic device that intersects with semantic mapping data of the second electronic device; and causing performance of the semantic mapping process based on the identification, wherein sources of intersecting semantic mapping data of the first and second electronic devices are to be known to both participating electronic devices of the semantic mapping process.

In one embodiment, a machine-readable storage medium stores instructions which, when executed by a processor, are capable of causing the processor to perform: receiving a first request from a first electronic device to participate in a semantic mapping process, the first request indicating a location for which the semantic mapping process is to be performed; matching the first request to a second request from a second electronic device to participate in a semantic mapping process for the location; notifying the first and second electronic device of the matching, the first and second electronic device being caused to identify, using a private set intersection protocol, from respective semantic mapping data of the first and second electronic devices, intersecting semantic mapping data of the first and second electronic devices that intersects with one another, wherein performance of the semantic mapping process is based on the identification, and wherein sources of intersecting semantic mapping data of the first and second electronic devices are to be known to both participating electronic devices of the semantic mapping process.

Embodiments of the invention provide privacy preservation through a hybrid of PSI protocol and obfuscation protocol that masks out ownership of the involved semantic mapping data (through secure MPC or another obfuscation protocol) at different stages at the semantic mapping process. They achieve the privacy-preserving advantages of a secure MPC protocol with fewer sacrifices to efficiency in processing as they leverage a private set intersection protocol to optimize the amount of semantic mapping data to be evaluated in cleartext or a symmetric/asymmetric encryption protocol and require less resources and may run more efficiently in the semantic mapping process.

BRIEF DESCRIPTION OF THE DRAWINGS

The invention may best be understood by referring to the following description and accompanying drawings that are used to illustrate embodiments of the invention. In the drawings:

FIG. 2 is a flow diagram illustrating collaborative semantic mapping operations leveraging a private set intersection (PSI) protocol per some embodiments.

FIG. 5 is a flow diagram illustrating collaborative semantic mapping operations by a data collection electronic device to leverage a private set intersection (PSI) protocol per some embodiments.

FIG. 6 is a flow diagram illustrating collaborative semantic mapping operations by a network node to leverage a private set intersection (PSI) protocol per some embodiments.

DETAILED DESCRIPTION

Figure 1:
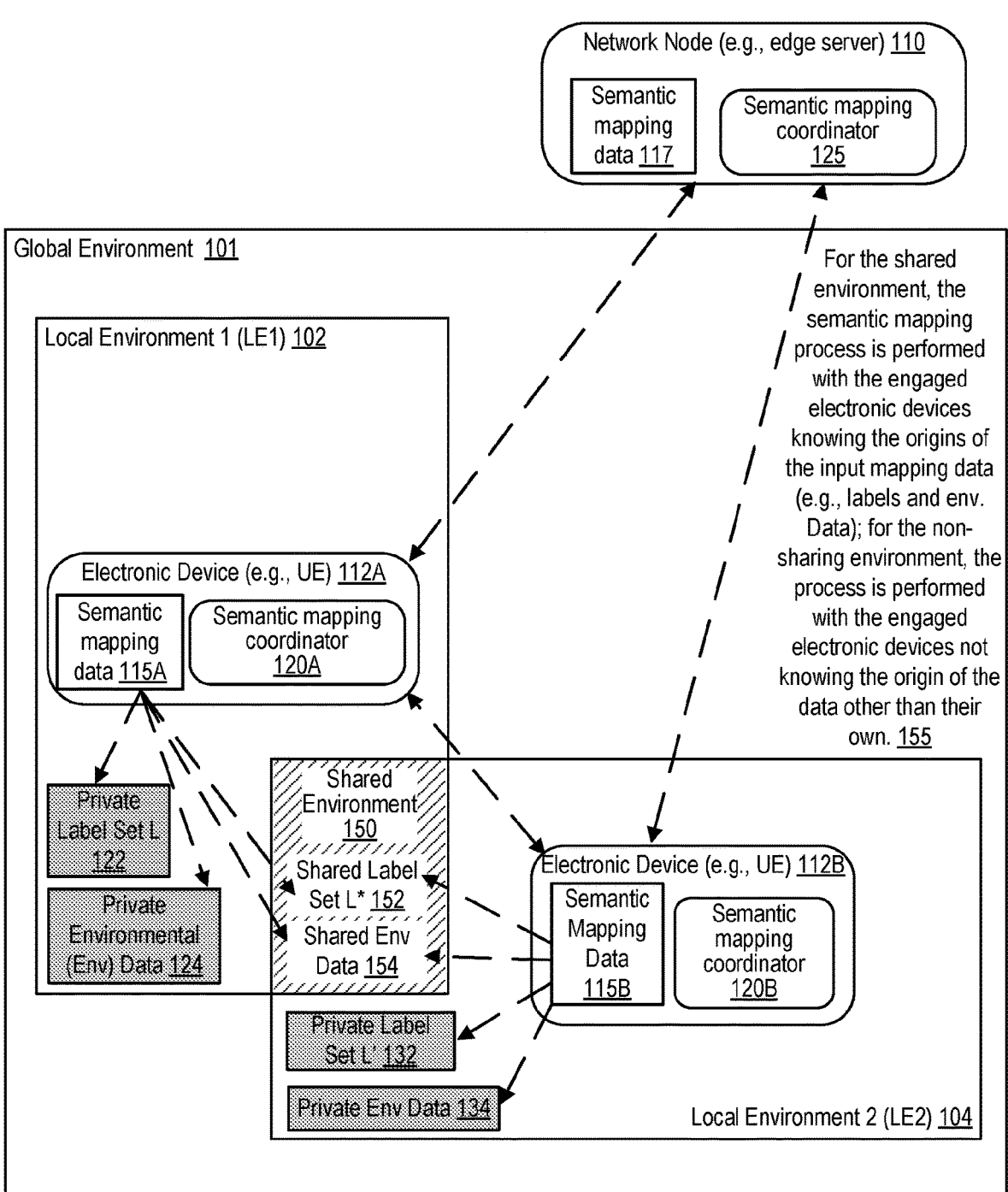
FIG. 1 illustrates a communication network for collaborative semantic mapping using private set intersection (PSI) protocols and secure multi-party computation (MPC) per some embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Collaborative Semantic Mapping Under Secure MPC

Collaborative semantic mapping may be performed through two or more electronic devices using secure multi-party computation (MPC). A straightforward implementation is to conduct secure MPC on full mapping and across all semantic labels to avoid leaking information about semantic labels or positioning data that may or may not be shared across trusted parties. This would process all information under secure MPC regardless of overlap in access to information in shared locations and shared semantic labels.

For example, N non-trusted parties may seek shared mapping data to perform collaborative semantic mapping. The non-trusted parties will obtain a semantic map (through collaborating among themselves only or through a non-trusted third party) while preserving privacy of their respective data. The non-trusted parties can be represented by a given number of electronic devices, $A_1, A_2, \ldots A_N$, each having private data respectively $S_1, S_2, \ldots, S_N$. Participants (or a third party) compute the value of a public function to build a shared semantic map to identify objects at a location: Semantic_mapping $(S_1, S_2, \ldots, S_N)$ without exposing which electronic device contributes what data—Semantic_mapping ( ) operating on the joint data set contributed by $A_1$, $A_2, \ldots A_N$ to obtain the semantic map, without the capability to trace particular data back to a particular $A_n$ that provides the data. Each participant does not learn more about $S_1, S_2, \ldots, S_N$ that it does not contribute through being involved in Semantic_mapping ( ).

For collaborative semantic mapping, the data provided by each participating electronic device includes two types of data, private environmental data S_e and private semantic label data (S_l). The environmental data S_e collected by an electronic device includes spatial (longitudinal and/or latitudinal) data and thematic information related to a particular location such as data on man-made features (e.g., building, roads) and nature features (e.g., land cover, soil, geology, topography, cultural features, water quality, minerals occurrences, fauna and flora, precipitation), and sensor data collection features (e.g., sensor's pose (position and rotation) in a three-dimensional (3D) space, timestamps of collected data). The semantic label data S_l includes semantic labels to be applied to the environmental data such as the semantic labels "road," "lane line," "sidewalk," "pedestrian," and "vehicle" discussed herein above.

Some secure MPC protocols are secure under a passive model (also called semi-honest threat model), but may need some additional features (auditing capabilities, etc.) to reach for malicious threat model standards, where adversary doesn't follow protocol and seeks to do harm by doing something like injecting bad data into the process. Other secure MPC protocols are implemented in an active model where the adversary may seek to do harm. Additional secure MPC protocols may be implemented in a fail-stop model in which the adversary may only make the semantic mapping computation crash without compromising the data privacy. Embodiments of the invention are not limited by a particular type of secure MPC protocols.

By using secure MPC protocols, the semantic mapping computation would uphold a higher standard of privacy by leaking no information about overlapping locations and semantic labels to participating electronic devices, it would trade off potential gains in speed and efficiency that could be realized if participating devices could efficiently discover overlapping areas and semantic labels to process outside of secure MPC.

Private Set Intersection (PSI)

Private set intersection (PSI) protocols are a set of secure multi-party computation (MPC) cryptographic techniques that allow two or more parties holding sets to compare encrypted versions of these sets in order to compute the intersection. Through PSI protocols, an involved party reveals anything to a counterparty or a third party except for the elements in the intersection.

PSI protocols can be categorized into specialized and generic (the latter also called circuit-based) ones. Specialized PSI protocols rely on cryptographic building blocks such as Diffie-Hellman key exchange, blind-RSA, El-Gamal encryption, Homomorphic Encryption (HE), Oblivious Transfer (OT), or Oblivious Pseudo-Random Functions (OPRFs) to securely compute nothing but the intersection itself. Generic PSI protocols utilize MPC protocols such as Yao's garbled circuits or the protocol by Goldreich, Micali, and Wigderson (GMW) that can securely evaluate Boolean circuits to determine the intersection. Besides computing the intersection, the generic PSI protocols may compute arbitrary functions on top of the intersection that might be of interest-without disclosing the intermediate intersection result. However, the lines between the two approaches are blurred, as there also exist specialized protocols to compute specific PSI variants.

Additionally, based on whether a third party is involved in the PSI operations, a PSI may be referred to as a traditional PSI, where the data owners interact directly with each other and need to have a copy of their set at the time of the computation; or it may be referred to a delegated PSI, where the computation of PSI and/or the storage of sets can be delegated to a third-party (e.g., an edge server or another network asset). The delegated PSI category can be further divided into two classes, those that support one-off delegation, and those that support repeated delegation. The PSI protocols that support one-off delegation require the data owner to re-encode its data and send the encoded data to the server for each computation, while those that support repeated delegation allow the data owners to upload their encrypted data to the third party only once, and then re-use it many times for each computation carried out by the third party.

PSI protocols also allow data owners to insert/delete set elements into/from their data with low overheads and in a privacy-preserving manner.

These PSI protocols predominantly differ in 1) the distribution of computation between devices, and 2) operations governing the division and distribution of data exchanged to carry out the protocol. Where resources are differentially constrained between devices, and/or where the share of data being exchanged for determination is sufficiently unequal to pose constraints to joint processing, protocols favoring greater centralization or delegation of processing closer to less constrained devices and/or parties with a larger share of data contributing to the operations should be selected.

Embodiments of the invention are not limited by a particular type of PSI protocol, and it can use specialized or generic PSI protocols based on data owner's status and desires. For example, based on an electronic device's resource constraints, a delegated PSI protocol may be used, so that a third-party (e.g., an edge server or another network asset) may be used to implement the PSI operations. Additionally, based on an electronic device's privacy policy (also referred to as security policy, and the two terms are used interchangeably herein), a different PSI protocol may be chosen.

Collaborative Semantic Mapping Leveraging PSI

Embodiments of the invention leverage PSI to securely identify overlapping location, so that corresponding environmental data and semantic labels may be exchanged among electronic devices that have the environmental data and semantic labels (and optionally exchanged with a third party) for collaborative semantic mapping. The electronic devices or a third party may thus perform semantic mapping for the overlapping location without the heavy encryption of secure MPC. The data for the identified overlapping location from the participating parties is limited in scope and is for semantic mapping of the identified overlapping location only, and they may be transmitted in cleartext or a symmetric/asymmetric encryption protocol. For the identified overlapping location, privacy preservation using secure MPC is no longer necessary since the participating parties are willing to share their data and privacy information such as which party provides what the data to gains in speed and efficiency of the semantic mapping.

FIG. 1 illustrates a communication network for collaborative semantic mapping using private set intersection (PSI) protocols and secure multi-party computation (MPC) per some embodiments. A communication network 100 includes a set of data collection electronic devices (112A to 112B) and a network node 110. While only two data collection electronic devices are shown, many more data collection electronic devices may be included in communication network 100 for semantic mapping. In some embodiments, each data collection electronic device includes a user equipment (UE).

The data collection electronic devices 112A to 112B may collect reflectance intensity data and other environmental data from a physical region (e.g., open/urban roads, office buildings, factory floor). For example, an electronic device 112A or 112B may have a set of sensors operating at the same or different wavelengths, including red-green-blue (RGB) camera sensors, light detection and ranging (LiDAR) sensors, and/or motion sensors. The environmental data includes the private environmental data S_e discussed herein. The collected environmental data may be used to construct a three-dimensional (3D) point cloud. A 3D point cloud (also referred to as point cloud, point cloud map, or simply map) is a set of data points representing a physical region (also referred to as space). The points of a point cloud may represent a 3D object in the physical region. While 3D point cloud is used as an example, embodiments of the invention may be used to construct a 2D point cloud or a higher dimensional point cloud where data including additional one or more dimensions such as time.

To construct a point cloud, semantic mapping may be performed to attach semantic labels to the points of the point cloud, where the semantic labels such as "road," "lane line," "sidewalk," "pedestrian," and "vehicle" map to the estimation of the meaning of the points in their physical region, which is also referred to as environment. The semantic labels include semantic label data S_l discussed herein. The physical region from which an electronic device collects environmental data is referred to as the local environment of the electronic device. As shown in FIG. 1, electronic devices 112A and 112B collect environmental data from local environment LE1 102 and LE2 104, respectively. Multiple electronic devices may be used to perform semantic mapping for an area, e.g., a factory floor or a college campus. The area for which a semantic map is to be built is referred to as the global environment as the area is the full region to build the semantic map. The global environment is shown at reference 101, which encompasses all local environments of data collection electronic devices for performing the semantic mapping.

When data collection electronic devices 112A to 112B operate at overlapping environments (also referred to as shared environment), it is beneficial to share the collected environmental data and the semantic labels to be mapped to the environmental data. For example, the semantic mapping to build the 3D may be done more efficiently when each electronic device includes different sensors, and sharing data with different characteristics (e.g., reflectance intensity in different wavelengths) allow a fuller characterization of an object in shared environment (shown as shared environment 150) so that semantic labels may be applied to be corresponding points more accurately and faster.

Each electronic device 112A/112B may include a semantic mapping coordinator and store mapping data, 120A/120B and 120B and 115A/115B, respectively. A portion of the mapping data may be shared because they are for the shared environment shown at reference 150. The stored mapping data 115A thus may be categorized as private data including private semantic label, private label set L 122, and private environmental data 124, and shared data that are included shared semantic label, shared label set L* 152, and shared environmental data 154, while the stored semantic mapping data 115B stores private data including private label set L' 132 and private environmental data 134, and shared data with electronic device 112B (shared label set L* 152, and shared environmental data 154).

In some embodiments, a network node 110 such as an edge server device may be engaged in the semantic mapping as a third party. For example, one or more of the data collection electronic devices may offload their semantic mapping data (environmental data and/or semantic labels) to network node 110, which may perform semantic mapping on behalf of the uploading electronic device, and network node 110 may be referred to as a delegated party/entity in that case. Network node 110 includes a semantic mapping coordinator 125 to coordinate semantic mapping and operate on offloaded semantic mapping data 117. While in embodiments network node 110 communicates with electronic devices 115A/115B in the third generation (3G), the fourth generation (4G), 4.5G, the fifth generation (5G), or the sixth generation (6G) wireless communication protocols, the communication may be through wireline communication protocols and/or proprietary wireless/wireline communication protocol in other embodiments.

Note that the offload from one or more electronic devices 115A/115B to network node 110 may provide more efficiency in the semantic mapping process as network node 110 may have more resources (e.g., bandwidth/computation/storage resources) than the offloading electronic device to perform the semantic mapping. Additionally, network node 110 may get offloaded semantic mapping data from multiple electronic devices and it may perform semantic mapping for the shared environment and/or non-overlapping local environment on the semantic data from multiple electronic devices without the need to obtain the semantic mapping data as the semantic mapping process is ongoing thus it may save the bandwidth and run the semantic mapping faster.

To perform semantic mapping in the global environment 101, secure multi-party computation (MPC) may be performed on all semantic label sets and environmental data collected by all electronic devices operating in the global environment. Such implementation, with or without delegation to network node 110, would avoid leaking information about semantic labels or positioning data that may or may not be shared across trusted parties.

Yet such indiscriminatory secure MPC implementation for semantic mapping is resource intensive and can be slow with any resource constraints at the electronic devices 112A/112B and network node 110. Note resource constraints on electronic devices 112A/112B and network node 110 are common. For example, as data collection devices, electronic devices 112A/112B are mobile thus the limitations on resources are more salient, including their computing resources (e.g., central processing unit (CPU) execution resources), storage resources (e.g., memory size), and networking resources (e.g., bandwidth for communication to another electronic device or network node). Additionally, when the third party engaged in the semantic mapping is a network node located at the edge of a network (e.g., an edge server device), their computing, storage, networking resources are often noticeable constrained, comparing to a network node at the core of a network.

Instead, embodiments of the invention leverage one or more private set intersection (PSI) protocols to securely establish which locations and semantic labels each has in common to determine what information can be processed in plaintext or symmetric/asymmetric encryption, either of which can be several orders of magnitude more efficient than a secure MPC implementation. While this efficiency comes at the expense of privacy for shared locations and semantic labels, the participating electronic devices are willing to disclose overlapping locations and semantic labels and process these under plaintext or symmetric/asymmetric encryption to realize these efficiency gains.

In some embodiments, for the shared environment 150, the semantic mapping process for electronic devices 112A and 112B is performed with the engaged electronic devices knowing the origins of the input semantic mapping data (e.g., semantic labels and environmental data), while for the non-sharing environment (environments of LE1 102 and LE2 104 that are outside of the shared environment 150), the semantic mapping process is performed with the engaged electronic devices not knowing the origins of the input semantic mapping data, as shown at reference 155.

Thus, once the one or more PSI protocols identifies a shared environment between electronic devices 112A and 112B, the semantic mapping process for the shared environment 150 does not need to use secure MPC, and the shared label set L* 152 and environment data 154 may be exchanged between electronic devices 112A and 112B, and between electronic device 112A/112B and network node 110 with shared privacy—while a party outside of the semantic mapping process is still prevented from knowing (1) the data and (2) from which party a particular data set is originated, the parties within the semantic mapping process operate on the data and may identify the source of a particular data set (semantic label set or environmental data set). The source of a particular data set refers to the electronic device from which the data is originally obtained to perform the semantic mapping. For example, a particular environmental data set may be collected from an electronic device, or a particular semantic label data set may be obtained from the electronic device, and the environmental/semantic label data set may be offloaded to a network node to perform the semantic mapping, and the source of the particular data set is the electronic device, not the delegated network node. The source of data may also be referred to as ownership or origin of the data, and they are used interchangeably herein. Exemplary Operations in Semantic Mapping Process that Leverage PSI Protocol FIG. 2 is a flow diagram illustrating collaborative semantic mapping operations leveraging a private set intersection (PSI) protocol per some embodiments. The operations may be performed by electronic devices 112A and 112B and network node 110 shown in the communication network 100.

At reference 202, an electronic device 112A or 112B may initiate a privacy preserving shared semantic mapping protocol using a request, either by (a) contacting network node 110 and indicating permission to discover other electronic devices within a known global environment (e.g., global environment 101) that are also engaged in a semantic mapping process, or (b) securely broadcasting/multicasting, to other electronic devices within the known global environment, the intent of the electronic device to initiate the privacy preserving shared semantic mapping protocol. The broadcasting/multicasting may be performed based on the security and privacy policies of the location within the global environment and functions of the global environment.

In either case (a) or (b), the initiating electronic device may indicate a time window; in the former case, the time window is for a duration in which the permission is active, and in the latter case, the time window is for a duration in which the other electronic devices needs to respond to the broadcast/multicast to be included in the privacy preserving shared semantic mapping protocol.

While the electronic device performs (a) or (b), the electronic device does not reveal any information that allows inference more than the global environment for identifying another electronic device by network node 110 or self-identifying to respond to the broadcast/multicast by the other electronic devices, since the semantic mapping data are assumed to be secret from network node 110 and other electronic devices. In some embodiments, the global environment is one order or more larger than a local environment from which a particular electronic device may collect data (e.g., global environment 101 may be one order or more larger than LE1 102 and LE2 104) so that the local environment information of an electronic device is not revealed.

At reference 204, network node 110 optionally matches electronic devices with permissions and task parameters, allowing the electronic devices to perform shared semantic mapping. While in some embodiments the permissions and task parameters of an electronic device for semantic mapping is known ahead of the semantic mapping process, in other embodiments, the permissions and task parameters of an electronic device may be learned through communications during the semantic mapping process (e.g., a request to network node by an electronic device to initiate privacy preserving shared semantic mapping protocol may include its permissions and/or task parameters).

The permissions of an electronic device for the privacy preserving shared semantic mapping protocol may indicate the scope and/or granularity of the semantic mapping data that the electronic device is permitted to share for the known global environment. The task parameters of the electronic device for the privacy preserving shared semantic mapping protocol may indicate scope of the semantic mapping, e.g., the scope and/or granularity of mapping semantic labels to environmental data through the privacy preserving shared semantic mapping protocol.

Alternatively, the electronic devices may, e.g., through performing (b) above, find a match between the electronic devices to perform shared semantic mapping with one another based on the permissions and task parameters of the electronic devices.

At reference 206, the matching electronic devices use a private set intersection (PSI) protocol to discover intersecting semantic mapping data. The intersecting semantic mapping data includes shared environmental data and semantic label data such as ones in a shared location (e.g., shared environment 150 as shown in FIG. 1). The matching electronic devices may select one or more sets of environmental data and corresponding semantic labels, each for a location, to discover semantic mapping data that intersects with semantic mapping data of another matching electronic device. When data for multiple locations are to be included in the discovery, the process of selecting the sets of environmental data and corresponding semantic labels to perform the discovery may be performed in parallel or one by one, based on available resources of the matching electronic devices (e.g., the more resources the electronic devices have, the more parallel discovery they may perform) and privacy policy of the matching electronic devices (e.g., the higher security/privacy an electronic device demands, the less parallel discovery it may perform to avoid breach). Note that the terms of "intersecting semantic mapping data" and "shared semantic mapping data" are used interchangeably herein The PSI protocol to discover the intersecting semantic data may be selected based on resource constraints and privacy policy of the matching electronic devices as well. When more computational resources are available and communication costs must remain low, stricter PSI protocols that consume more resources but forgo extensive rounds of communication, such as those employing fully homomorphic encryption (FHE) may be performed while preserving a high degree of security. In addition, when tasks allow for only one round of intersection determination, PSI protocols designed for one-shot intersection determination may be selected over more stringent protocols that maintain security over multiple queries and changes to participant data sets.

In some embodiments, the semantic mapping data of an electronic device may be offloaded to a network node (e.g., network node 110) so that the network node performs the PSI protocol to discover intersecting semantic mapping data on behalf of the offloading electronic device (delegated PSI). In that case, the available resources and privacy policy of the network node are factors to consider in selecting the PSI protocol and how the discovery is performed (parallel for multiple locations or one-by-one).

In some embodiments, the resource constraints and privacy policy of electronic devices are not required to be kept as secrets to each other, and they may be communicated with each other through cleartext or known encryption (e.g., a symmetric or asymmetric key sharing protocol), and then used to select the PSI to discover the intersecting semantic mapping data. In alternative embodiments, the resource constraints and privacy policy of electronic devices are required to be kept as secrets to each other but are permitted to share with a third party (e.g., network node 110), the trusted third party then receives the resource constraints and privacy policy of electronic devices, which serve as the basis for the third party to select the PSI protocol.

At reference 208, the matching electronic devices perform the shared semantic mapping based on the intersecting semantic mapping data, sources of the intersecting semantic mapping data knowable to the matching electronic devices (e.g., in cleartext and/or using encryption keys).

In some embodiments, the intersecting semantic mapping data are exchanged in cleartext without any encryption so a receiving electronic device can easily know from which electronic device the data is transmitted, even when more than two electronic devices are involved in the semantic mapping. In alternative embodiments, one or more of a symmetric or asymmetric key sharing protocol may be implemented for exchanging the intersecting semantic mapping data, and the corresponding symmetric or asymmetric keys are exchanged prior to performing the semantic mapping process based on the intersecting semantic mapping data. In that case, each electronic device may know the sourcing electronic device of the intersecting semantic mapping data after decryption as well.

At reference 210, the matching electronic devices optionally perform additional shared semantic mapping based on non-intersecting semantic mapping data with sources of the non-intersecting semantic mapping data known only to corresponding data owners of the non-intersecting semantic mapping data within the matching electronic devices. The additional shared semantic mapping may be performed through secure MPC or another obfuscation protocol, so that an electronic device does not know more about the non-intersecting semantic mapping data other than the semantic mapping data it has contributed, after the additional shared semantic mapping—the electronic device still only knows the portion of the non-intersecting semantic mapping data that the electronic device has contributed to the additional shared semantic mapping. The selection of a secure MPC protocol or another obfuscation protocol may be based on the resource constraints and privacy policy of electronic devices.

The operations of 202 to 208 may be repeated multiple times to identify all semantic mapping data that intersect multiple electronic devices, and since the semantic mapping based on the identified intersecting semantic mapping data may be performed without secure MPC or another obfuscation protocol to mask out the ownership of the involved data (preserving the privacy of the involved electronic device), the semantic mapping on the identified intersecting semantic mapping data may be performed significantly faster than semantic mapping on similar size semantic mapping data with secure MPC or another obfuscation protocol to mask out the ownership of the involved data.

After all the intersecting semantic mapping data are identified, the remaining semantic mapping data may then be used to perform semantic mapping with secure MPC or another obfuscation protocol, which offers a high level of privacy protection of the remaining semantic mapping data (an involved electronic device knows about the mapping data it contributes but can't learn from which electronic device the other mapping data are transmitted to perform the semantic mapping).

Note that the privacy preserving shared semantic mapping protocol disclosed herein is a hybrid of PSI protocol and secure MPC protocol (or another obfuscation protocol) used at different stages at the semantic mapping process. The PSI selection at reference 206 and the selection of secure MPC or another obfuscation protocol at reference 210 may be saved at the electronic devices and/or network node(s) for future use. The saved PSI selection and the selection of secure MPC or another obfuscation protocol may be the starting point for a future semantic mapping, and they are used on new semantic mapping data, and then adjusted (e.g., changed to a different PSI or secure MPC protocol or the same PSI and secure MPC protocol but with different parameters).

Figure 3:
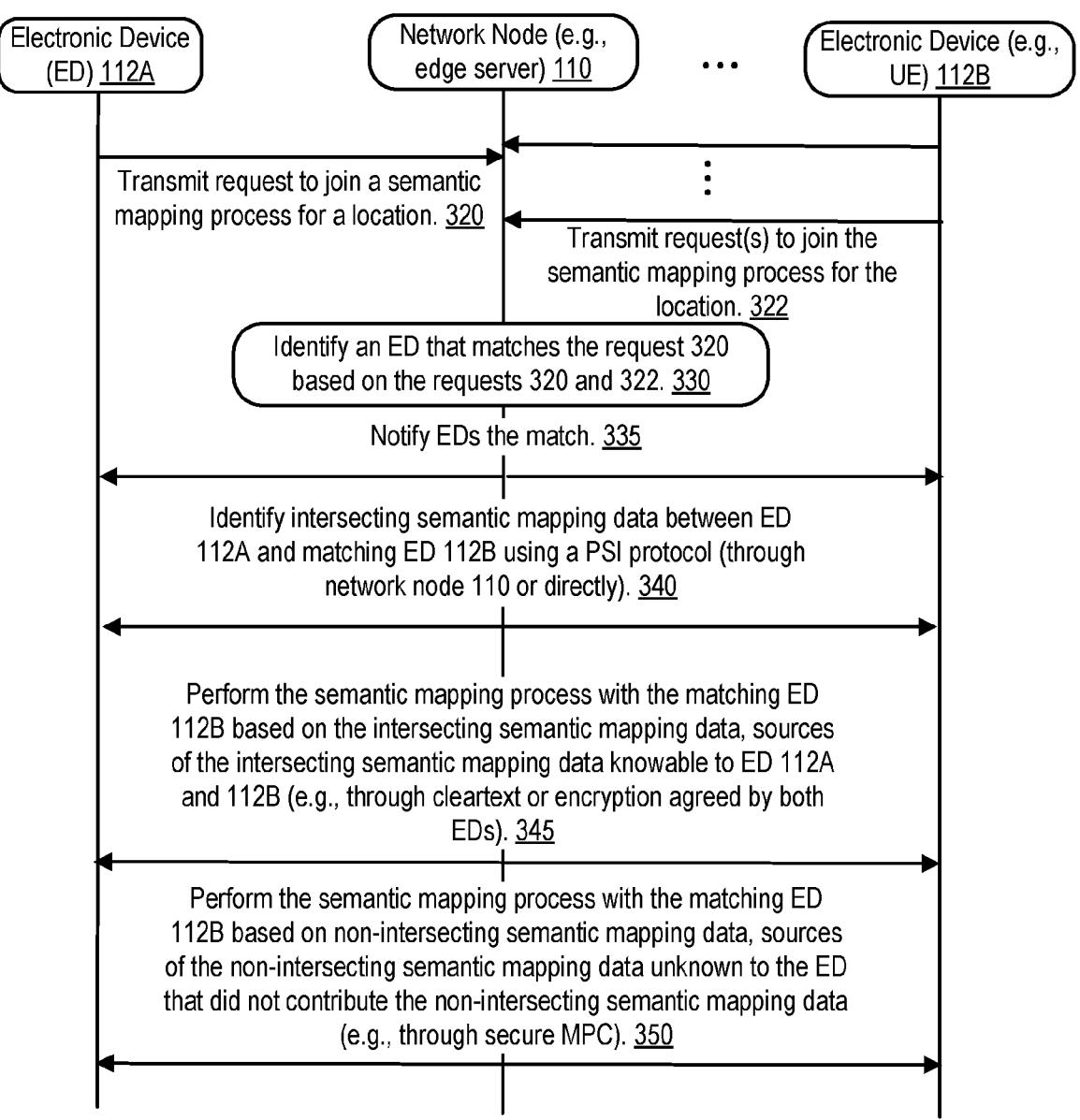
FIG. 3 illustrates collaborative semantic mapping operations leveraging a private set intersection (PSI) protocol per a first set of embodiments.

The following two block diagrams illustrate the interactions between data collection electronic devices, and between data collection devices and a network node. FIG. 3 illustrates collaborative semantic mapping operations leveraging a private set intersection (PSI) protocol per a first set of embodiments. The electronic devices 112A and 112B, and network node 110 are engaged in the collaborative semantic mapping. At reference 320, the process starts with an electronic device transmitting a request to participate in a semantic mapping process for a location to network node 110. The request may include a time window as discussed herein relating to FIG. 2. One or more other electronic devices, including electronic device 112B, may transmit requests to participate in the semantic mapping process for the location as well and one exemplary request is shown at reference 322.

As shown, network node 110 receives the request to participate in the semantic mapping process for the location from electronic device 112A and one or more requests to participate in the semantic mapping process for the location from one or more electronic devices including electronic device 112B.

While the process starts with an electronic device sending a request as shown in the figure, a network node may initiate the semantic mapping process by polling the electronic devices in a network for their need to perform collaborative semantic mapping, and the electronic device may respond with a request indicating for which location that they are willing to participate in the collaborative semantic mapping.

In either case, network node then identifies an electronic device that matches the request from electronic device 112A at reference 230, and the identified electronic device is electronic device 112B in this example. The matching may be based on permissions and task parameters as discussed herein. While only one matching electronic device (electronic device 112B in this example) is shown, the semantic mapping process may involve more than two electronic devices (and may involve one or more network nodes as coordinator or delegate as in this example), and in which case multiple electronic devices may match the request from electronic device 112A in some embodiments.

Each request may indicate a location for which the semantic mapping process is to be performed, and request matching does not require the indicated locations to be the same. For example, the request from electronic device 112A may indicate a global location of college campus A, while the request from electronic device 112B may indicate a global location of building B of college campus A, so that one indicated location may be a subset of another. Alternatively, the request from electronic device 112A may indicate a global location of factory floor for product A while the request from electronic device 112B may indicate a global location of factory floor for product B; when the products share a portion of the factory floor (e.g., the entrance of raw materials and delivery areas), in which case one indicated location may overlap another indicated location. When the indicated locations from the requests of electronic devices are not the same, network node 110 may identify a location for which the collaborative sematic mapping process is to be performed by the involved electronic devices, electronic devices 112A and 112B in this example.

In some embodiments, each request may include multiple locations for which the electronic device plans to perform collaborative semantic mapping. Having multiple locations within one request allows the matching performed by network node 110 to perform faster.

An electronic device may have collected environmental data from multiple locations and have obtained corresponding semantic label sets for the environmental data from multiple locations, yet indicate only the one or more locations in the request, as it is willing to trade off lesser privacy protection for semantic mapping efficiency for the particular indicated one or more locations.

At reference 335, network node 110 notifies the electronic devices that are included in the match, and they are electronic devices 112A and 112B in this example. The matching electronic devices then identify intersecting semantic mapping data between electronic devices 112A and 112B using a private set intersection (PSI) protocol at reference 340. The intersecting semantic data includes shared environmental data 154 and semantic label data (shared label set L*) 152 in some embodiments. The selection of the PSI protocol may be based on resource constraints and privacy policy of the involved electronic devices and/or a delegated network node performing semantic mapping on behalf of an offloading electronic device.

The identification of intersecting semantic mapping data between electronic devices 112A and 112B using the PSI protocol may be performed directly between the two electronic devices (or when more than two electronic devices are identified as matching electronic devices, these electronic devices may communicate directly with each other).

Alternatively, the identification may be performed through a network node such as network node 110. An electronic device may offload their mapping data (e.g., environmental data and semantic label data) to the network node, which then becomes a delegate of the offloading electronic device and may perform the identification of intersecting semantic mapping data with one or more other electronic devices on behalf of the offloading electronic device. While FIG. 3 shows that the network node 110 may identify the matching electronic device(s) (at reference 330) and may serve as a delegate of an offloading electronic device (at reference 340, when the identifying the intersecting semantic data is "through" the network node 110), two network nodes may each perform one of the two operations in alternative embodiments.

Through the PSI protocol, electronic devices 112A and 112B identify the intersecting semantic mapping data without disclosing the source of the particular data, so that an electronic device (e.g., electronic device 112A or 112B) does not learn more about the involved semantic mapping data (environmental or semantic label data) that electronic device does not contribute itself in the process of identifying the intersecting semantic mapping data.

Then at reference 345, electronic devices 112A and 112B perform the semantic mapping process based on the intersecting semantic mapping data, where the sources of the intersecting semantic mapping data are knowable to both electronic device 112A and 112B, regardless of which electronic device contributes the intersecting semantic mapping data to the semantic mapping process for the mapping. The semantic mapping on the intersecting semantic mapping data may attach corresponding intersecting semantic labels to the points of a point cloud for the location (identified at reference 320/322 or reference 330).

At reference 350, electronic devices 112A and 112B perform the semantic mapping process based on the non-intersecting semantic mapping data, where the sources of the non-intersecting semantic mapping data are unknown to the electronic device that did not contribute the non-intersecting semantic mapping data. For example, the semantic mapping process for the non-intersecting semantic mapping data may be performed using secure MPC discussed herein above.

While the operations at reference 345 follow the ones at reference 350 as shown in the figure, these operations may be performed in parallel, or the latter may be performed ahead of the former. Since the intersecting semantic mapping data at reference 345 and non-intersecting semantic mapping data at reference 350 are mutually exclusive, no particular order in performing these operations is required.

While the operations at references 345 and 350 are shown to be performed directly between the two electronic devices (or when more than two electronic devices are identified as matching electronic devices, these electronic devices may communicate directly with each other), they can be performed through a delegate of an offloading electronic device, similar to the identification of intersecting semantic mapping data using the PSI protocol at reference 340.

While one or more network nodes may coordinate the semantic mapping process and/or serve as a delegate in the semantic mapping process as discussed herein above, alternative embodiments may perform the semantic mapping process using a PSI protocol directly.

Figure 4:
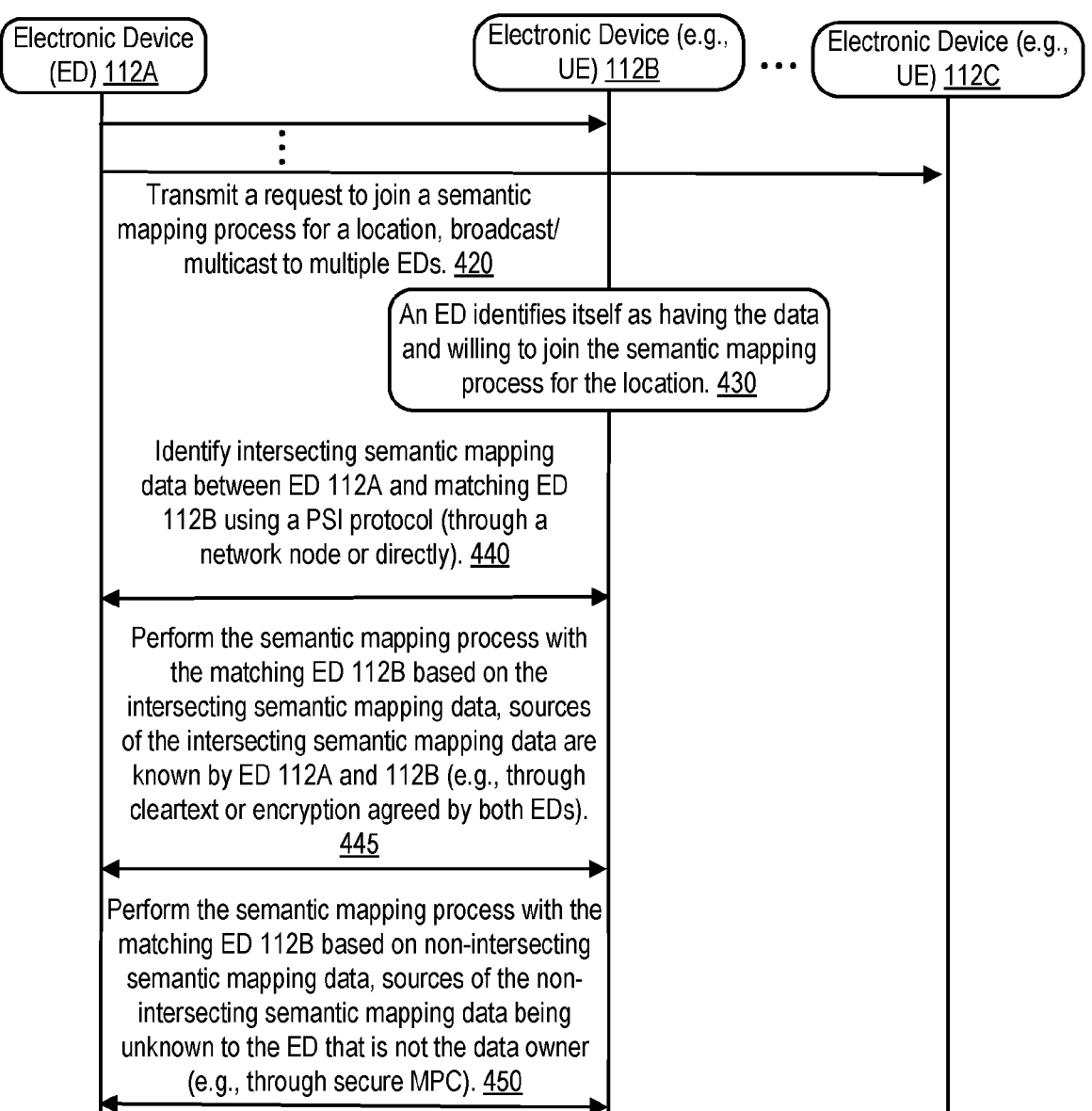
FIG. 4 illustrates collaborative semantic mapping operations leveraging a private set intersection (PSI) protocol per a second set of embodiments.

FIG. 4 illustrates collaborative semantic mapping operations leveraging a private set intersection (PSI) protocol per a second set of embodiments. The electronic devices 112A and 112B are engaged in collaborative semantic mapping. One electronic device, electronic device 112A in this example, transmits a request to join a semantic mapping process for a location, and the request may be broadcasted (to all electronic devices in a network) or multi-casted (to selected multiple electronic devices in the network) to the network. For multicasting, the electronic device 112A may select the target electronic devices based on a set of criteria—e.g., the closest ones in a physical region or ones with one or more particular types of sensors to supplement mapping data collected by the electronic device. The request may be similar to the ones discussed relating to FIG. 3, including indicated location, time window, permissions, and/or task parameters.

A receiving electronic device, electronic device 112B in this example, may identify itself as having the mapping data for the location and is willing to join the semantic mapping process for the location with the requesting electronic device. The electronic device 112B may identify itself the same as network node 110 identifies a matching electronic device, discussed herein above.

Once electronic device 112B identifies itself as a matching electronic device, it may notify electronic device 112A about the match. The electronic devices 112A and 112B may then perform identification of intersecting semantic mapping data using a PSI protocol at reference 440; perform the semantic mapping process based on the intersecting semantic mapping data at reference 445, where the sources of the intersecting semantic mapping data are knowable to both electronic device 112A and 112B; and perform the semantic mapping process based on the non-intersecting semantic mapping data at reference 450, where the sources of the non-intersecting semantic mapping data are unknown to the electronic device that did not contribute the non-intersecting semantic mapping data. All of these operations at 440, 445, and 450 may be similar to the ones performed at 240, 245, and 250, respectively.

Operational Flows Per Some Embodiments

FIG. 5 is a flow diagram illustrating collaborative semantic mapping operations by a data collection electronic device to leverage a private set intersection (PSI) protocol per some embodiments. The operations of method 500 may be performed by an electronic device such as electronic device 112A in some embodiments.

At reference 502, a first electronic device transmits a request to participate in a semantic mapping process, the request indicating a location for which the semantic mapping process is to be performed. The request includes request 320 discussed herein in some embodiments.

At reference 504, the first electronic device receives a response to the request, indicating a second electronic device that matches the request to perform the semantic mapping process. The response may be received from a network node (as shown in FIG. 3) or from an electronic device (as shown in FIG. 4).

At reference 506, the first electronic device identifies, using a private set intersection protocol, from semantic mapping data of the first electronic device, intersecting semantic mapping data of the first electronic device that intersects with semantic mapping data of the second electronic device. At reference 508, the first electronic device causes performance of the semantic mapping process based on the identification, wherein sources of intersecting semantic mapping data of the first and second electronic devices are to be known to both participating electronic devices of the semantic mapping process.

In some embodiments, the request to participate in the semantic mapping process indicates a time period during which the request is active.

In some embodiments, the request to participate in the semantic mapping process is sent to a network node of the network, and wherein the response to the request is received from the network node of the network. Such request is shown in FIG. 3.

In some embodiments, the second electronic device is identified based on the location provided in the request from the first electronic device, wherein the second electronic device stores semantic mapping data for the location. For example, the second electronic device may be electronic device 112B that stores semantic mapping data 115B.

In some embodiments, the private set intersection protocol is selected based on one or more of a set of resource constraints of the first electronic device and privacy policy of the first electronic device.

In some embodiments, the semantic mapping data of the first electronic device comprises: (a) label data to identify objects in a first environment under which the first electronic device operates, and (b) corresponding environmental data of the first environment. The label data may be shared label set L* 152 and the corresponding environmental data may be the shared environmental data 154, and the identified object is in the shared environment 150.

In some embodiments, the intersecting semantic mapping data of the first electronic device is provided to the second electronic device under cleartext. In alternative embodiments, the intersecting semantic mapping data of the first electronic device is provided to the second electronic device using one or more of a symmetric or asymmetric key sharing protocol.

In some embodiments, the request to participate in the semantic mapping process is sent to a plurality of electronic devices including the second electronic device, and wherein the response to the request is received from the second electronic device. FIG. 4 shows one of such embodiments.

In some embodiments, the semantic mapping process is performed on a network node apart from the first and second electronic devices, wherein the first and second electronic devices offload the intersecting semantic mapping data of the first electronic device and the corresponding intersecting semantic mapping data of the second electronic device to the network node. In such embodiments, the first electronic device sends a request to cause the performance of the semantic mapping process by the network node (e.g., network node 110) as a delegate.

In some embodiments, the method further comprises causing performance of the semantic mapping process based on at least a portion of semantic mapping data from the first and second electronic devices that are not intersecting at reference 510, where sources of the portion of the semantic mapping data are not exposed to each other electronic devices. The semantic mapping process based on at least a portion of semantic mapping data from the first and second electronic devices that are not intersecting may use secure MPC or another obfuscation protocol as discussed herein.

In some embodiments, the portion of non-intersecting semantic mapping data of the first electronic device comprises environmental data of a first environment under which the first electronic device operates and information about one or more poses of sensors from which the semantic mapping data of the first electronic device is obtained. Such environmental data includes private environmental data S_e discussed herein.

FIG. 6 is a flow diagram illustrating collaborative semantic mapping operations by a network node to leverage a private set intersection (PSI) protocol per some embodiments. The operations of method 600 may be network node 110 discussed herein above.

At reference 602, the network node receives a first request from a first electronic device to participate in a semantic mapping process, the first request indicating a location for which the semantic mapping process is to be performed. The request is request 320 discussed herein in some embodiments.

At reference 604, the network node matches the first request to a second request from a second electronic device to participate in a semantic mapping process for the location. The second request is request 322 in some embodiments. In some embodiments, the request to participate in the semantic mapping process indicates a time period during which the request is active.

At reference 606, the network node causes intersecting semantic mapping data of the first and second electronic devices that intersects with one another to be identified, using a private set intersection protocol, from respective semantic mapping data of the first and second electronic devices, where performance of the semantic mapping process is based on the identification, and where sources of intersecting semantic mapping data of the first and second electronic devices are to be known to both participating electronic devices of the semantic mapping process. The notification comprises the one at reference 335 in some embodiments.

In some embodiments, the private set intersection protocol is performed through the network node that receives the semantic mapping data of the first and second electronic devices and identifies the intersecting semantic mapping data of the first and second electronic devices. The network node may serve as a delegate of the first and/or second electronic device to perform the private set intersection protocol in these embodiments as shown at reference 340. In that case, the private set intersection protocol is performed between the network node and an electronic device (instead of between the first and second electronic devices).

In some embodiments, the private set intersection protocol is selected based on resource constraints of the first and second electronic devices and privacy policy of the first and second electronic devices.

In some embodiments, the intersecting semantic mapping data of the first and second electronic devices are provided to each other under cleartext. In alternative embodiments, the intersecting semantic mapping data of the first and second electronic devices are provided to each other using one or more of a symmetric or asymmetric key.

In some embodiments, the semantic mapping process is performed on the network node, where the first and second electronic devices offload the intersecting semantic mapping data of the first and second electronic devices to the network node. In these embodiments, the performance of the semantic mapping process for the intersecting semantic mapping data is delegated to the network node.

In some embodiments, the method further comprises causing performance of the semantic mapping process based on at least a portion of semantic mapping data from the first and second electronic devices that are not intersecting, where sources of the portion of the semantic mapping data are not exposed to each other electronic devices. The network node may send a request to the first and second electronic devices, so that the first and second electronic devices perform the semantic mapping process on the portion of semantic mapping data. Alternatively, one or more of the first and second electronic devices may offload their semantic mapping data to the network node, which in turn performs the semantic mapping process on behalf of the offloading electronic device.

Embodiments of the invention provide privacy preservation through a hybrid of PSI protocol and obfuscation protocol that masks out ownership of the involved semantic mapping data (through secure MPC or another obfuscation protocol) at different stages at the semantic mapping process. They achieve the privacy-preserving advantages of a secure MPC protocol with fewer sacrifices to efficiency in the semantic mapping process as they leverage a private set intersection protocol on relevant semantic mapping data to optimize the amount of semantic mapping data to be evaluated in cleartext or a symmetric/asymmetric encryption protocol (e.g., in a pre-secure MPC stage), so they require less resources in the semantic mapping process and may run more efficiently. Additionally, a network node may serve as a delegate for an electronic device in various stages of the semantic mapping process and that provides further efficiency as well.

Devices Implementing Embodiments of the Invention

Figure 7:
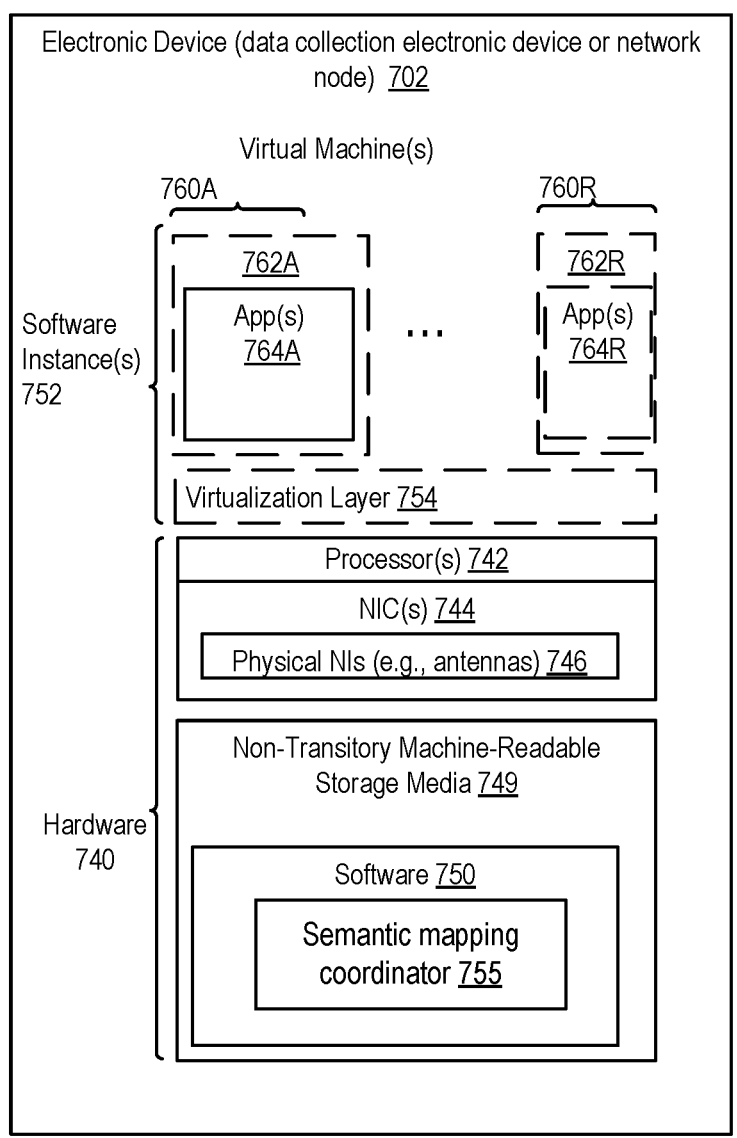
FIG. 7 illustrates an electronic device implementing adaptive fault remediation per some embodiments.

FIG. 7 illustrates an electronic device implementing collaborative semantic mapping operations leveraging a private set intersection (PSI) protocol per some embodiments. The electronic device 702 may be data collection electronic device (e.g., electronic device 112A/B), or a network node that coordinates (and/or serves as a delegate in) the collaborative semantic mapping process in a wireless/wireline network.

The electronic device 702 may be implemented using custom application-specific integrated-circuits (ASICs) as processors and a special-purpose operating system (OS), or common off-the-shelf (COTS) processors and a standard OS. In some embodiments, the electronic device 702 implements a semantic mapping coordinator 755.

The electronic device 702 includes hardware 740 comprising a set of one or more processors 742 (which are typically COTS processors or processor cores or ASICs) and physical NIs 746, as well as non-transitory machine-readable storage media 749 having stored therein software 750. During operation, the one or more processors 742 may execute the software 750 to instantiate one or more sets of one or more applications 764A-R. While one embodiment does not implement virtualization, alternative embodiments may use different forms of virtualization. For example, in one such alternative embodiment, the virtualization layer 754 represents the kernel of an operating system (or a shim executing on a base operating system) that allows for the creation of multiple instances 762A-R called software containers that may each be used to execute one (or more) of the sets of applications 764A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment, the virtualization layer 754 represents a hypervisor (sometimes referred to as a virtual machine monitor (VMM)) or a hypervisor executing on top of a host operating system, and each of the sets of applications 764A-R run on top of a guest operating system within an instance 762A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels, and sets of applications that are run in different software containers).

The software 750 contains a semantic mapping coordinator 755 that performs operations described with reference to operations as discussed relating to FIGS. 1 to 6. The semantic mapping coordinator 755 may be instantiated within the applications 764A-R. The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual electronic device 760A-R.

A network interface (NI) may be physical or virtual. In the context of IP, an interface address is an IP address assigned to an NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). The NI is shown as network interface card (NIC) 744. The physical network interface 746 may include one or more antenna of the electronic device 702. An antenna port may or may not correspond to a physical antenna. The antenna comprises one or more radio interfaces.

The electronic devices and network nodes to implement embodiments of the invention may be implanted in various networks and environments discussed in more details herein below.

A Wireless Network Per Some Embodiments

Figure 8:
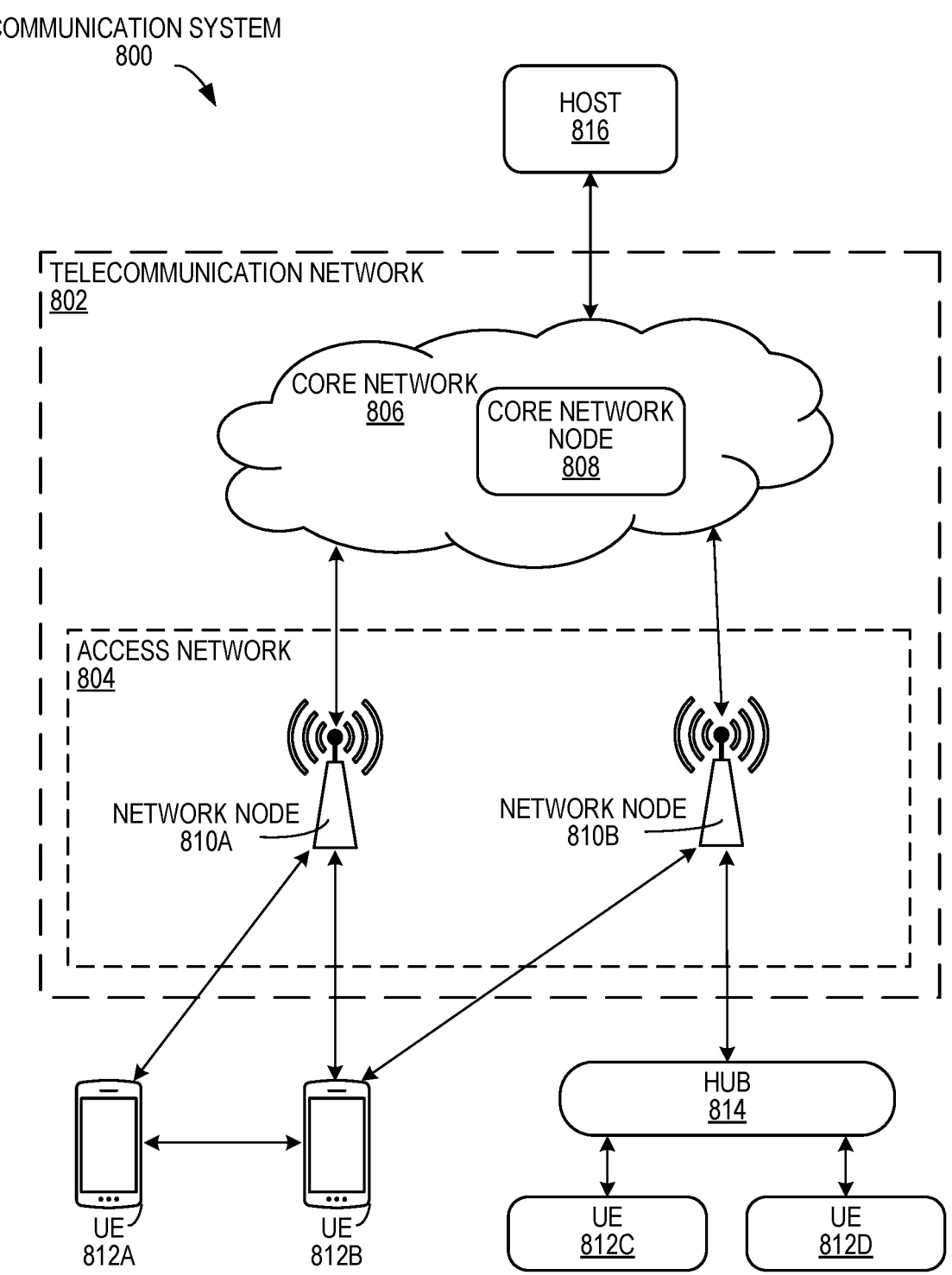
FIG. 8 illustrates an example of a communication system per some embodiments.

FIG. 8 illustrates an example of a communication system 800 per some embodiments. Each of the electronic devices 112A to 112C may be implemented as one of UEs 812A to 812D, and network node 110 may be implemented as one of network nodes 810A and 810B.

In the example, the communication system 800 includes a telecommunication network 802 that includes an access network 804, such as a radio access network (RAN), and a core network 806, which includes one or more core network nodes 808. The access network 804 includes one or more access network nodes, such as network nodes 810a and 810b (one or more of which may be generally referred to as network nodes 810), or any other similar $3^{rd}$ Generation Partnership Project (3GPP) access node or non-3GPP access point. The network nodes 810 facilitate direct or indirect connection of user equipment (UE), such as by connecting UEs 812a, 812b, 812c, and 812d (one or more of which may be generally referred to as UEs 812) to the core network 806 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 800 may include any number of wired or wireless networks, network nodes, UEs, and/or any other components or systems that may facilitate or participate in the communication of data and/or signals whether via wired or wireless connections. The communication system 800 may include and/or interface with any type of communication, telecommunication, data, cellular, radio network, and/or other similar type of system.

The UEs 812 may be any of a wide variety of communication devices, including wireless devices arranged, configured, and/or operable to communicate wirelessly with the network nodes 810 and other communication devices. Similarly, the network nodes 810 are arranged, capable, configured, and/or operable to communicate directly or indirectly with the UEs 812 and/or with other network nodes or equipment in the telecommunication network 802 to enable and/or provide network access, such as wireless network access, and/or to perform other functions, such as administration in the telecommunication network 802.

In the depicted example, the core network 806 connects the network nodes 810 to one or more hosts, such as host 816. These connections may be direct or indirect via one or more intermediary networks or devices. In other examples, network nodes may be directly coupled to hosts. The core network 806 includes one more core network nodes (e.g., core network node 808) that are structured with hardware and software components. Features of these components may be substantially similar to those described with respect to the UEs, network nodes, and/or hosts, such that the descriptions thereof are generally applicable to the corresponding components of the core network node 808. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 816 may be under the ownership or control of a service provider other than an operator or provider of the access network 804 and/or the telecommunication network 802, and may be operated by the service provider or on behalf of the service provider. The host 816 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 800 of FIG. 8 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 802 is a cellular network that implements 3GPP standardized features. Accordingly, the telecommunications network 802 may support network slicing to provide different logical networks to different devices that are connected to the telecommunication network 802. For example, the telecommunications network 802 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 812 are configured to transmit and/or receive information without direct human interaction. For instance, a UE may be designed to transmit information to the access network 804 on a predetermined schedule, when triggered by an internal or external event, or in response to requests from the access network 804. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 814 communicates with the access network 804 to facilitate indirect communication between one or more UEs (e.g., UE 812c and/or 812d) and network nodes (e.g., network node 810b). In some examples, the hub 814 may be a controller, router, content source and analytics, or any of the other communication devices described herein regarding UEs. For example, the hub 814 may be a broadband router enabling access to the core network 806 for the UEs. As another example, the hub 814 may be a controller that sends commands or instructions to one or more actuators in the UEs. Commands or instructions may be received from the UEs, network nodes 810, or by executable code, script, process, or other instructions in the hub 814. As another example, the hub 814 may be a data collector that acts as temporary storage for UE data and, in some embodiments, may perform analysis or other processing of the data. As another example, the hub 814 may be a content source. For example, for a UE that is a VR headset, display, loudspeaker or other media delivery device, the hub 814 may retrieve VR assets, video, audio, or other media or data related to sensory information via a network node, which the hub 814 then provides to the UE either directly, after performing local processing, and/or after adding additional local content. In still another example, the hub 814 acts as a proxy server or orchestrator for the UEs, in particular in if one or more of the UEs are low energy IoT devices.

The hub 814 may have a constant/persistent or intermittent connection to the network node 810b. The hub 814 may also allow for a different communication scheme and/or schedule between the hub 814 and UEs (e.g., UE 812c and/or 812d), and between the hub 814 and the core network 806. In other examples, the hub 814 is connected to the core network 806 and/or one or more UEs via a wired connection. Moreover, the hub 814 may be configured to connect to an M2M service provider over the access network 804 and/or to another UE over a direct connection. In some scenarios, UEs may establish a wireless connection with the network nodes 810 while still connected via the hub 814 via a wired or wireless connection. In some embodiments, the hub 814 may be a dedicated hub—that is, a hub whose primary function is to route communications to/from the UEs from/to the network node 810b. In other embodiments, the hub 814 may be a non-dedicated hub—that is, a device which is capable of operating to route communications between the UEs and network node 810b, but which is additionally capable of operating as a communication start and/or end point for certain data channels.

UE Per Some Embodiments

Figure 9:
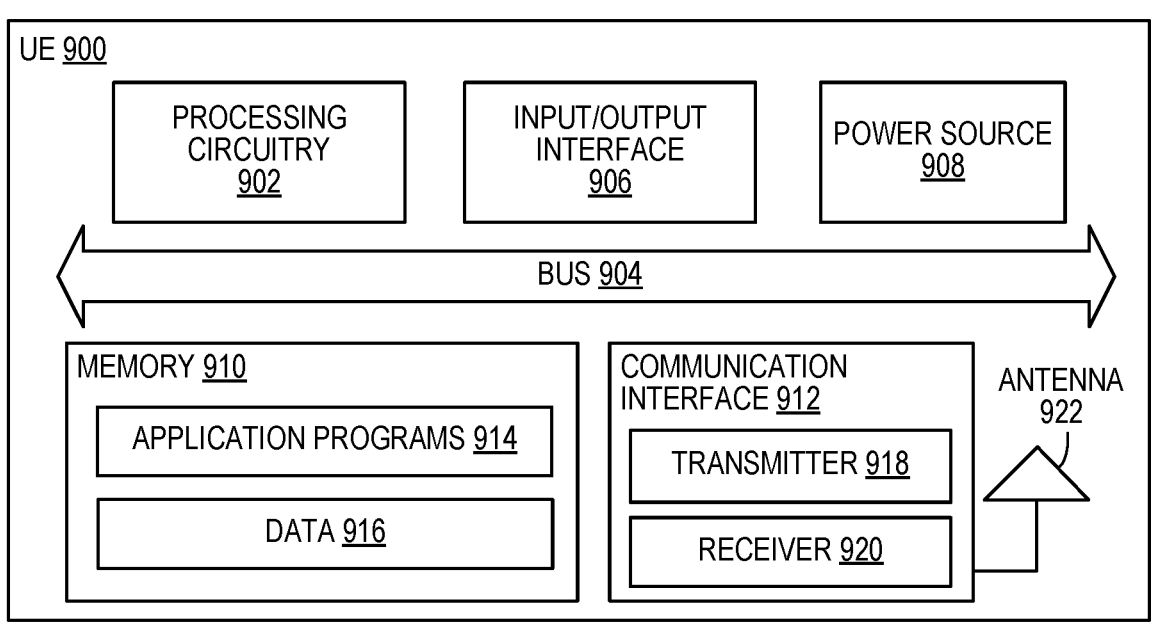
FIG. 9 illustrates a UE per some embodiments.

FIG. 9 illustrates a UE 900 per some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the $3^{rd}$ Generation Partnership Project (3GPP), including a narrow band internet of things (NB-IoT) UE, a machine type communication (MTC) UE, and/or an enhanced MTC (eMTC) UE. Each of the electronic devices 112A to 112C may be implemented as UE 900 in some embodiments.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 900 includes processing circuitry 902 that is operatively coupled via a bus 904 to an input/output interface 906, a power source 908, a memory 910, a communication interface 912, and/or any other component, or any combination thereof. Certain UEs may utilize all or a subset of the components shown in FIG. 9. The level of integration between the components may vary from one UE to another UE. Further, certain UEs may contain multiple instances of a component, such as multiple processors, memories, transceivers, transmitters, receivers, etc.

The processing circuitry 902 is configured to process instructions and data and may be configured to implement any sequential state machine operative to execute instructions stored as machine-readable computer programs in the memory 910. The processing circuitry 902 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 902 may include multiple central processing units (CPUs).

In the example, the input/output interface 906 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 900. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 908 is structured as a battery or battery pack. Other types of power sources, such as an external power source (e.g., an electricity outlet), photovoltaic device, or power cell, may be used. The power source 908 may further include power circuitry for delivering power from the power source 908 itself, and/or an external power source, to the various parts of the UE 900 via input circuitry or an interface such as an electrical power cable. Delivering power may be, for example, for charging of the power source 908. Power circuitry may perform any formatting, converting, or other modification to the power from the power source 908 to make the power suitable for the respective components of the UE 900 to which power is supplied.

The memory 910 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 910 includes one or more application programs 914, such as an operating system, web browser application, a widget, gadget engine, or other application, and corresponding data 916. The memory 910 may store, for use by the UE 900, any of a variety of various operating systems or combinations of operating systems.

The memory 910 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 910 may allow the UE 900 to access instructions, application programs and the like, stored on transitory or non-transitory memory media, to off-load data, or to upload data. An article of manufacture, such as one utilizing a communication system may be tangibly embodied as or in the memory 910, which may be or comprise a device-readable storage medium.

The processing circuitry 902 may be configured to communicate with an access network or other network using the communication interface 912. The communication interface 912 may comprise one or more communication subsystems and may include or be communicatively coupled to an antenna 922. The communication interface 912 may include one or more transceivers used to communicate, such as by communicating with one or more remote transceivers of another device capable of wireless communication (e.g., another UE or a network node in an access network). Each transceiver may include a transmitter 918 and/or a receiver 920 appropriate to provide network communications (e.g., optical, electrical, frequency allocations, and so forth). Moreover, the transmitter 918 and receiver 920 may be coupled to one or more antennas (e.g., antenna 922) and may share circuit components, software or firmware, or alternatively be implemented separately.

In the illustrated embodiment, communication functions of the communication interface 912 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 912, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 900 shown in FIG. 9.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Network Node Per Some Embodiments

Figure 10:
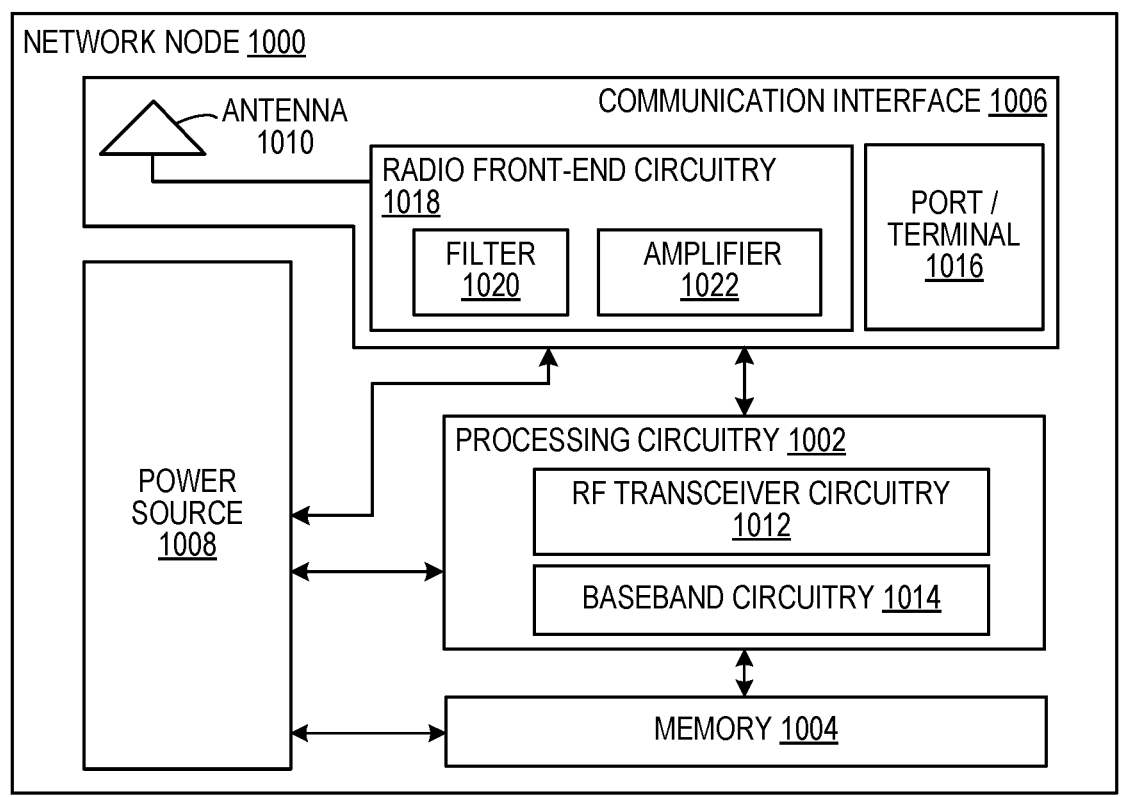
FIG. 10 illustrates a network node per some embodiments.

FIG. 10 illustrates a network node 1000 per some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Network node 110 may be implemented as network node 1000 in some embodiments.

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1000 includes a processing circuitry 1002, a memory 1004, a communication interface 1006, and a power source 1008. The network node 1000 may be composed of multiple physically separate components (e.g., a NodeB component and a RNC component, or a BTS component and a BSC component, etc.), which may each have their own respective components. In certain scenarios in which the network node 1000 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1000 may be configured to support multiple radio access technologies (RATs). In such embodiments, some components may be duplicated (e.g., separate memory 1004 for different RATs) and some components may be reused (e.g., a same antenna 1010 may be shared by different RATs). The network node 1000 may also include multiple sets of the various illustrated components for different wireless technologies integrated into network node 1000, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1000.

The processing circuitry 1002 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1000 components, such as the memory 1004, to provide network node 1000 functionality.

In some embodiments, the processing circuitry 1002 includes a system on a chip (SOC). In some embodiments, the processing circuitry 1002 includes one or more of radio frequency (RF) transceiver circuitry 1012 and baseband processing circuitry 1014. In some embodiments, the radio frequency (RF) transceiver circuitry 1012 and the baseband processing circuitry 1014 may be on separate chips (or sets of chips), boards, or units, such as radio units and digital units. In alternative embodiments, part or all of RF transceiver circuitry 1012 and baseband processing circuitry 1014 may be on the same chip or set of chips, boards, or units.

The memory 1004 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1002. The memory 1004 may store any suitable instructions, data, or information, including a computer program, software, an application including one or more of logic, rules, code, tables, and/or other instructions capable of being executed by the processing circuitry 1002 and utilized by the network node 1000. The memory 1004 may be used to store any calculations made by the processing circuitry 1002 and/or any data received via the communication interface 1006. In some embodiments, the processing circuitry 1002 and memory 1004 is integrated.

The communication interface 1006 is used in wired or wireless communication of signaling and/or data between a network node, access network, and/or UE. As illustrated, the communication interface 1006 comprises port(s)/terminal(s) 1016 to send and receive data, for example to and from a network over a wired connection. The communication interface 1006 also includes radio front-end circuitry 1018 that may be coupled to, or in certain embodiments a part of, the antenna 1010. Radio front-end circuitry 1018 comprises filters 1020 and amplifiers 1022. The radio front-end circuitry 1018 may be connected to an antenna 1010 and processing circuitry 1002. The radio front-end circuitry may be configured to condition signals communicated between antenna 1010 and processing circuitry 1002. The radio front-end circuitry 1018 may receive digital data that is to be sent out to other network nodes or UEs via a wireless connection. The radio front-end circuitry 1018 may convert the digital data into a radio signal having the appropriate channel and bandwidth parameters using a combination of filters 1020 and/or amplifiers 1022. The radio signal may then be transmitted via the antenna 1010. Similarly, when receiving data, the antenna 1010 may collect radio signals which are then converted into digital data by the radio front-end circuitry 1018. The digital data may be passed to the processing circuitry 1002. In other embodiments, the communication interface may comprise different components and/or different combinations of components.

In certain alternative embodiments, the network node 1000 does not include separate radio front-end circuitry 1018, instead, the processing circuitry 1002 includes radio front-end circuitry and is connected to the antenna 1010. Similarly, in some embodiments, all or some of the RF transceiver circuitry 1012 is part of the communication interface 1006. In still other embodiments, the communication interface 1006 includes one or more ports or terminals 1016, the radio front-end circuitry 1018, and the RF transceiver circuitry 1012, as part of a radio unit (not shown), and the communication interface 1006 communicates with the baseband processing circuitry 1014, which is part of a digital unit (not shown).

The antenna 1010 may include one or more antennas, or antenna arrays, configured to send and/or receive wireless signals. The antenna 1010 may be coupled to the radio front-end circuitry 1018 and may be any type of antenna capable of transmitting and receiving data and/or signals wirelessly. In certain embodiments, the antenna 1010 is separate from the network node 1000 and connectable to the network node 1000 through an interface or port.

The antenna 1010, communication interface 1006, and/or the processing circuitry 1002 may be configured to perform any receiving operations and/or certain obtaining operations described herein as being performed by the network node. Any information, data and/or signals may be received from a UE, another network node and/or any other network equipment. Similarly, the antenna 1010, the communication interface 1006, and/or the processing circuitry 1002 may be configured to perform any transmitting operations described herein as being performed by the network node. Any information, data and/or signals may be transmitted to a UE, another network node and/or any other network equipment.

The power source 1008 provides power to the various components of network node 1000 in a form suitable for the respective components (e.g., at a voltage and current level needed for each respective component). The power source 1008 may further comprise, or be coupled to, power management circuitry to supply the components of the network node 1000 with power for performing the functionality described herein. For example, the network node 1000 may be connectable to an external power source (e.g., the power grid, an electricity outlet) via an input circuitry or interface such as an electrical cable, whereby the external power source supplies power to power circuitry of the power source 1008. As a further example, the power source 1008 may comprise a source of power in the form of a battery or battery pack which is connected to, or integrated in, power circuitry. The battery may provide backup power should the external power source fail.

Embodiments of the network node 1000 may include additional components beyond those shown in FIG. 10 for providing certain aspects of the network node's functionality, including any of the functionality described herein and/or any functionality necessary to support the subject matter described herein. For example, the network node 1000 may include user interface equipment to allow input of information into the network node 1000 and to allow output of information from the network node 1000. This may allow a user to perform diagnostic, maintenance, repair, and other administrative functions for the network node 1000.

Host Per Some Embodiments

Figure 11:
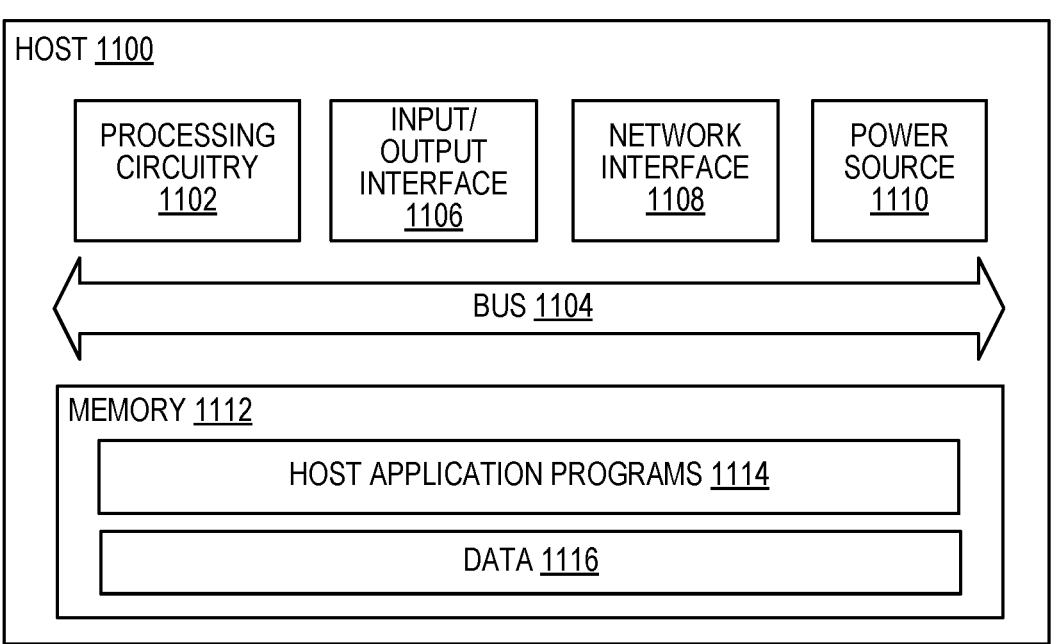
FIG. 11 is a block diagram of a host, which may be an embodiment of the host of FIG. 8, per various aspects described herein.

FIG. 11 is a block diagram of a host 1100, which may be an embodiment of the host 816 of FIG. 8, per various aspects described herein. As used herein, the host 1100 may be or comprise various combinations hardware and/or software, including a standalone server, a blade server, a cloud-implemented server, a distributed server, a virtual machine, container, or processing resources in a server farm. The host 1100 may provide one or more services to one or more UEs.

The host 1100 includes processing circuitry 1102 that is operatively coupled via a bus 1104 to an input/output interface 1106, a network interface 1108, a power source 1110, and a memory 1112. Other components may be included in other embodiments. Features of these components may be substantially similar to those described with respect to the devices of previous figures, such as FIGS. 9 and 10, such that the descriptions thereof are generally applicable to the corresponding components of host 1100.

The memory 1112 may include one or more computer programs including one or more host application programs 1114 and data 1116, which may include user data, e.g., data generated by a UE for the host 1100 or data generated by the host 1100 for a UE. Embodiments of the host 1100 may utilize only a subset or all of the components shown. The host application programs 1114 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or imple-mentations of UEs (e.g., handsets, desktop computers, wear-able display systems, heads-up display systems). The host application programs 1114 may also provide for user authen-tication and licensing checks and may periodically report health, routes, and content availability to a central node, such as a device in or on the edge of a core network. Accordingly, the host 1100 may select and/or indicate a different host for over-the-top services for a UE. The host application programs 1114 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Virtualization Environment Per Some Embodiments

Figure 12:
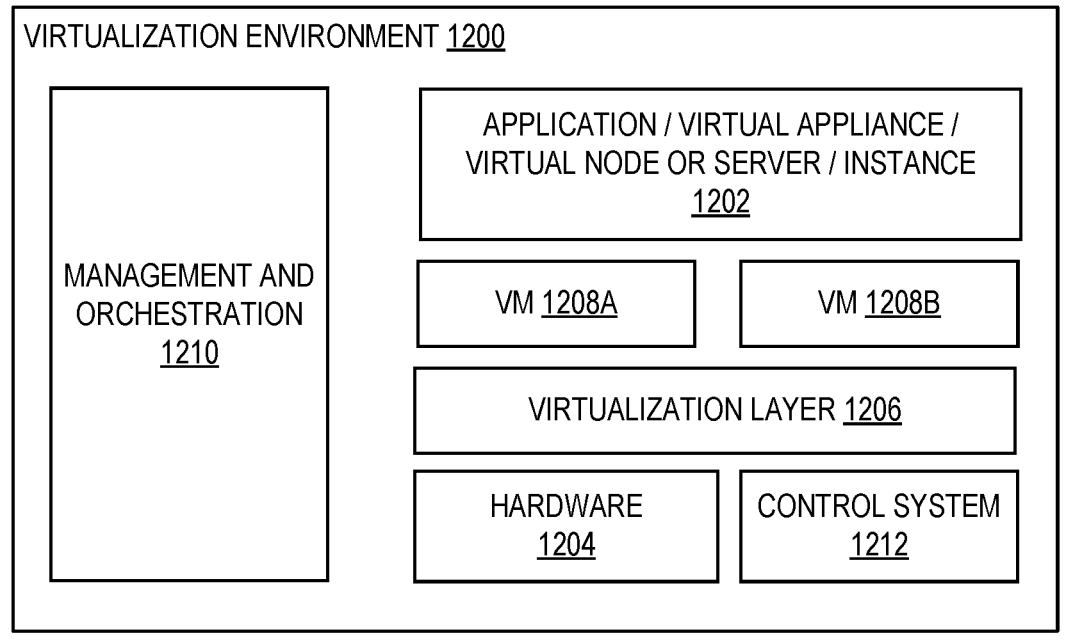
FIG. 12 is a block diagram illustrating a virtualization environment in which functions implemented by some embodiments may be virtualized.

FIG. 12 is a block diagram illustrating a virtualization environment 1200 in which functions implemented by some embodiments may be virtualized. In the present context, virtualizing means creating virtual versions of apparatuses or devices which may include virtualizing hardware plat-forms, storage devices and networking resources. As used herein, virtualization can be applied to any device described herein, or components thereof, and relates to an implemen-tation in which at least a portion of the functionality is implemented as one or more virtual components. Some or all of the functions described herein may be implemented as virtual components executed by one or more virtual machines (VMs) implemented in one or more virtual envi-ronments 1200 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1202 (which may alternatively be called software instances, virtual appliances, network functions, virtual nodes, virtual network functions, etc.) are run in the virtualization environment Q400 to implement some of the features, functions, and/or benefits of some of the embodi-ments disclosed herein.

Hardware 1204 includes processing circuitry, memory that stores software and/or instructions executable by hard-ware processing circuitry, and/or other hardware devices as described herein, such as a network interface, input/output interface, and so forth. Software may be executed by the processing circuitry to instantiate one or more virtualization layers 1206 (also referred to as hypervisors or virtual machine monitors (VMMs)), provide VMs 1208*a* and 1208*b* (one or more of which may be generally referred to as VMs 1208), and/or perform any of the functions, features and/or benefits described in relation with some embodiments described herein. The virtualization layer 1206 may present a virtual operating platform that appears like networking hardware to the VMs 1208.

The VMs 1208 comprise virtual processing, virtual memory, virtual networking or interface and virtual storage, and may be run by a corresponding virtualization layer 1206. Different embodiments of the instance of a virtual appliance 1202 may be implemented on one or more of VMs 1208, and the implementations may be made in different ways. Virtu-alization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1208 may be a software implementation of a physical machine that runs programs as if they were executing on a physical, non-virtualized machine. Each of the VMs 1208, and that part of hardware 1204 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1208 on top of the hardware 1204 and corresponds to the application 1202.

Hardware 1204 may be implemented in a standalone network node with generic or specific components. Hard-ware 1204 may implement some functions via virtualization. Alternatively, hardware 1204 may be part of a larger cluster of hardware (e.g., such as in a data center or CPE) where many hardware nodes work together and are managed via management and orchestration 1210, which, among others, oversees lifecycle management of applications 1202. In some embodiments, hardware 1204 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1212 which may alternatively be used for communication between hardware nodes and radio units.

Communication Among Host, Network Node, and UE Per Some Embodiments

Figure 13:
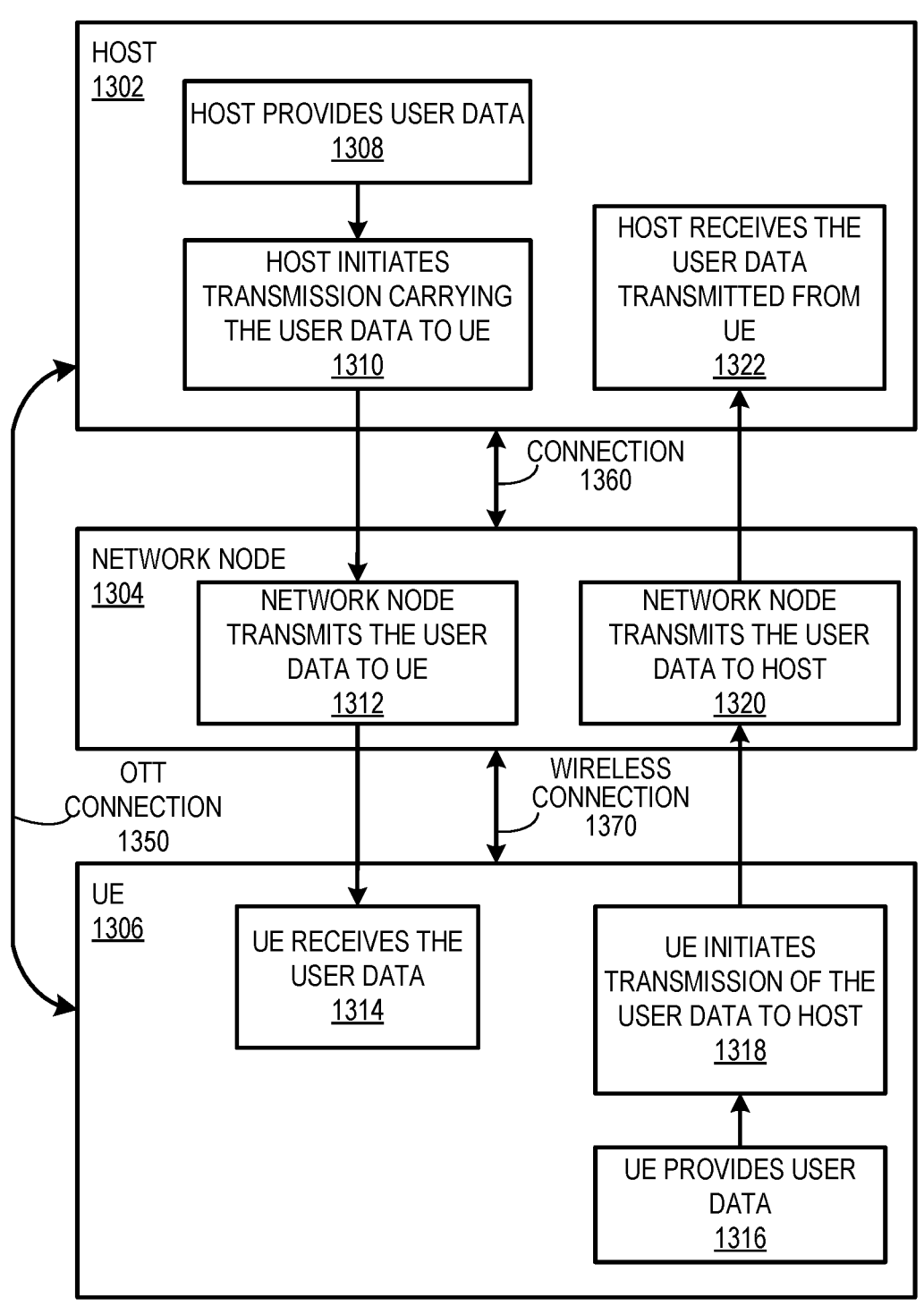
FIG. 13 illustrates a communication diagram of a host communicating via a network node with a UE over a partially wireless connection per some embodiments.

FIG. 13 illustrates a communication diagram of a host 1302 communicating via a network node 1304 with a UE 1306 over a partially wireless connection per some embodiments. Example implementations, in accordance with various embodiments, of the UE (such as a UE 812*a* of FIG. 8 and/or UE 900 of FIG. 9), network node (such as network node 810*a* of FIG. 8 and/or network node 1000 of FIG. 10), and host (such as host 816 of FIG. 8 and/or host 1100 of FIG. 11) discussed in the preceding paragraphs will now be described with reference to FIG. 13.

Like host 1100, embodiments of host 1302 include hardware, such as a communication interface, processing circuitry, and memory. The host 1302 also includes software, which is stored in or accessible by the host 1302 and executable by the processing circuitry. The software includes a host application that may be operable to provide a service to a remote user, such as the UE 1306 connecting via an over-the-top (OTT) connection 1350 extending between the UE 1306 and host 1302. In providing the service to the remote user, a host application may provide user data which is transmitted using the OTT connection 1350.

The network node 1304 includes hardware enabling it to communicate with the host 1302 and UE 1306. The connection 1360 may be direct or pass through a core network (like core network 806 of FIG. 8) and/or one or more other intermediate networks, such as one or more public, private, or hosted networks. For example, an intermediate network may be a backbone network or the Internet.

The UE 1306 includes hardware and software, which is stored in or accessible by UE 1306 and executable by the UE's processing circuitry. The software includes a client application, such as a web browser or operator-specific "app" that may be operable to provide a service to a human or non-human user via UE 1306 with the support of the host 1302. In the host 1302, an executing host application may communicate with the executing client application via the OTT connection 1350 terminating at the UE 1306 and host 1302. In providing the service to the user, the UE's client application may receive request data from the host's host application and provide user data in response to the request data. The OTT connection 1350 may transfer both the request data and the user data. The UE's client application may interact with the user to generate the user data that it provides to the host application through the OTT connection 1350.

The OTT connection 1350 may extend via a connection 1360 between the host 1302 and the network node 1304 and via a wireless connection 1370 between the network node 1304 and the UE 1306 to provide the connection between the host 1302 and the UE 1306. The connection 1360 and wireless connection 1370, over which the OTT connection 1350 may be provided, have been drawn abstractly to illustrate the communication between the host 1302 and the UE 1306 via the network node 1304, without explicit reference to any intermediary devices and the precise routing of messages via these devices.

As an example of transmitting data via the OTT connection 1350, in step 1308, the host 1302 provides user data, which may be performed by executing a host application. In some embodiments, the user data is associated with a particular human user interacting with the UE 1306. In other embodiments, the user data is associated with a UE 1306 that shares data with the host 1302 without explicit human interaction. In step 1310, the host 1302 initiates a transmission carrying the user data towards the UE 1306. The host 1302 may initiate the transmission responsive to a request transmitted by the UE 1306. The request may be caused by human interaction with the UE 1306 or by operation of the client application executing on the UE 1306. The transmission may pass via the network node 1304, in accordance with the teachings of the embodiments described throughout this disclosure. Accordingly, in step 1312, the network node 1304 transmits to the UE 1306 the user data that was carried in the transmission that the host 1302 initiated, in accordance with the teachings of the embodiments described throughout this disclosure. In step 1314, the UE 1306 receives the user data carried in the transmission, which may be performed by a client application executed on the UE 1306 associated with the host application executed by the host 1302.

In some examples, the UE 1306 executes a client application which provides user data to the host 1302. The user data may be provided in reaction or response to the data received from the host 1302. Accordingly, in step 1316, the UE 1306 may provide user data, which may be performed by executing the client application. In providing the user data, the client application may further consider user input received from the user via an input/output interface of the UE 1306. Regardless of the specific manner in which the user data was provided, the UE 1306 initiates, in step 1318, transmission of the user data towards the host 1302 via the network node 1304. In step 1320, in accordance with the teachings of the embodiments described throughout this disclosure, the network node 1304 receives user data from the UE 1306 and initiates transmission of the received user data towards the host 1302. In step 1322, the host 1302 receives the user data carried in the transmission initiated by the UE 1306.

In an example scenario, factory status information may be collected and analyzed by the host 1302. As another example, the host 1302 may process audio and video data which may have been retrieved from a UE for use in creating maps. As another example, the host 1302 may collect and analyze real-time data to assist in controlling vehicle congestion (e.g., controlling traffic lights). As another example, the host 1302 may store surveillance video uploaded by a UE. As another example, the host 1302 may store or control access to media content such as video, audio, VR or AR which it can broadcast, multicast or unicast to UEs. As other examples, the host 1302 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1350 between the host 1302 and UE 1306, in response to variations in the measurement results. The measurement procedure and/or the network functionality for reconfiguring the OTT connection may be implemented in software and hardware of the host 1302 and/or UE 1306. In some embodiments, sensors (not shown) may be deployed in or in association with other devices through which the OTT connection 1350 passes; the sensors may participate in the measurement procedure by supplying values of the monitored quantities exemplified above, or supplying values of other physical quantities from which software may compute or estimate the monitored quantities. The reconfiguring of the OTT connection 1350 may include message format, retransmission settings, preferred routing etc.; the reconfiguring need not directly alter the operation of the network node 1304. Such procedures and functionalities may be known and practiced in the art. In certain embodiments, measurements may involve proprietary UE signaling that facilitates measurements of throughput, propagation times, latency and the like, by the host 1302. The measurements may be implemented in that software causes messages to be transmitted, in particular empty or 'dummy' messages, using the OTT connection 1350 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

TERMS

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of wireless or wireline communication between two or more elements that are coupled with each other. A "set," as used herein, refers to any positive whole number of items including one item.

An electronic device (e.g., a data collection electronic device or a network node discussed herein) stores and transmits (internally and/or with other electronic devices over a network) code (which is composed of software instructions and which is sometimes referred to as a computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical, or other form of propagated signals-such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, or a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radio frequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to an NIC. One or more parts of an embodiment of the invention may be implemented using different combinations of software, firmware, and/or hardware.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

What is claimed is:

1. A method to be implemented in a first electronic device of a network, comprising:

transmitting a request to participate in a semantic mapping process, the request indicating a location for which the semantic mapping process is to be performed;

receiving a response to the request, indicating a second electronic device that matches the request to perform the semantic mapping process;

identifying, using a private set intersection protocol, from semantic mapping data of the first electronic device, intersecting semantic mapping data of the first electronic device that intersects with semantic mapping data of the second electronic device in an intersecting location shared between the first and second electronic devices within the location indicated in the request, wherein the private set intersection protocol is selected to identify the intersecting semantic mapping data based on one or more of a set of resource constraints of the first electronic device and privacy policy of the first electronic device;

for the intersecting location, causing performance of the semantic mapping process based on the identification, wherein sources of intersecting semantic mapping data of the first and second electronic devices are to be known to both participating electronic devices of the semantic mapping process; and for an area within the location but outside of the intersecting location, allowing the second electronic device to access semantic mapping data of the first electronic device corresponding to the area but blocking the second electronic device from accessing source information of the semantic mapping data of the first electronic device corresponding to the area.

2. The method of claim 1, wherein the request to participate in the semantic mapping process indicates a time period during which the request is active.

3. The method of claim 1, wherein the request to participate in the semantic mapping process is sent to a network node of the network, and wherein the response to the request is received from the network node of the network.

4. The method of claim 1, wherein the second electronic device is identified based on the location provided in the request from the first electronic device, wherein the second electronic device stores semantic mapping data for the location.

5. The method of claim 1, wherein the semantic mapping data of the first electronic device comprises:

label data to identify objects in a first environment under which the first electronic device operates, and corresponding environmental data of the first environment.

6. The method of claim 1, wherein the intersecting semantic mapping data of the first electronic device is provided to the second electronic device under cleartext.

7. The method of claim 1, wherein the intersecting semantic mapping data of the first electronic device is provided to the second electronic device using one or more of a symmetric or asymmetric key sharing protocol.

8. The method of claim 1, wherein the request to participate in the semantic mapping process is sent to a plurality of electronic devices including the second electronic device, and wherein the response to the request is received from the second electronic device.

9. The method of claim 1, wherein the semantic mapping process is performed on a network node apart from the first and second electronic devices, wherein the first and second electronic devices offload the intersecting semantic mapping data of the first electronic device and corresponding intersecting semantic mapping data of the second electronic device to the network node.

10. The method of claim 1, further comprising:

causing performance of the semantic mapping process based on at least a portion of semantic mapping data from the first and second electronic devices that are not intersecting, where sources of the portion of the semantic mapping data are not exposed to each other electronic devices, wherein the portion of non-intersecting semantic mapping data of the first electronic device comprises environmental data of a first environment under which the first electronic device operates and information about one or more poses of sensors from which the semantic mapping data of the first electronic device is obtained.

11. The method of claim 1, wherein the first electronic device comprises a user equipment of the network.

12. A method to be implemented in a network node of a network, comprising:

receiving a first request from a first electronic device to participate in a semantic mapping process, the first request indicating a location for which the semantic mapping process is to be performed;

matching the first request to a second request from a second electronic device to participate in a semantic mapping process for the location; and causing intersecting semantic mapping data of the first and second electronic devices that intersects with one another in an intersecting location shared between the first and second electronic devices within the location indicated in the request to be identified, using a private set intersection protocol, from respective semantic mapping data of the first and second electronic devices, wherein for the intersecting location, performance of the semantic mapping process is based on the identification, wherein sources of intersecting semantic mapping data of the first and second electronic devices are to be known to both participating electronic devices of the semantic mapping process, wherein for an area within the location but outside of the intersecting location, access to semantic mapping data of the first electronic device corresponding to the area is allowed but access to source information of the semantic mapping data of the first electronic device corresponding to the area by the second electronic device is blocked, and wherein the semantic mapping data of the first electronic device corresponding to the area comprises environmental data of a first environment under which the first electronic device operates and information about one or more poses of sensors from which the semantic mapping data of the first electronic device is obtained.

13. The method of claim 12, wherein the private set intersection protocol is performed through the network node that receives the semantic mapping data of the first and second electronic devices and identifies the intersecting semantic mapping data of the first and second electronic devices.

14. The method of claim 12, wherein each of the first and second requests to participate in the semantic mapping process indicates a time period during which the first or second request is active.

15. The method of claim 12, wherein the private set intersection protocol is selected based on resource constraints of the first and second electronic devices and privacy policy of the first and second electronic devices.

16. The method of claim 12, wherein the intersecting semantic mapping data of the first and second electronic devices are provided to each other under cleartext.

17. The method of claim 12, wherein the intersecting semantic mapping data of the first and second electronic devices are provided to each other using one or more of a symmetric or asymmetric key.

18. The method of claim 12, wherein the semantic mapping process is performed on the network node, wherein the first and second electronic devices offload the intersecting semantic mapping data of the first and second electronic devices to the network node.

19. An electronic device, comprising:
a processor and machine-readable storage medium that provides instructions that, when executed by the processor, are capable of causing the processor to perform:
transmitting a request to participate in a semantic mapping process, the request indicating a location for which the semantic mapping process is to be performed;
receiving a response to the request, indicating a second electronic device that matches the request to perform the semantic mapping process;
identifying, using a private set intersection protocol, from semantic mapping data of the electronic device, intersecting semantic mapping data of the electronic device that intersects with semantic mapping data of the second electronic device in an intersecting location shared between the electronic device and second electronic device within the location indicated in the request, wherein the private set intersection protocol is selected based on one or more of a set of resource constraints of the electronic device and privacy policy of the electronic device;
for the intersecting location, causing performance of the semantic mapping process based on the identification, wherein sources of intersecting semantic mapping data of the electronic device and second electronic devices are to be known to both participating electronic devices of the semantic mapping process; and
for an area within the location but outside of the intersecting location, allowing the second electronic device to access semantic mapping data of the electronic device corresponding to the area but blocking the second electronic device from accessing source information of the semantic mapping data of the electronic device corresponding to the area.

20. A network node, comprising:
a processor and machine-readable storage medium that provides instructions that, when executed by the processor, are capable of causing the processor to perform:
receiving a first request from a first electronic device to participate in a semantic mapping process, the first request indicating a location for which the semantic mapping process is to be performed;
matching the first request to a second request from a second electronic device to participate in a semantic mapping process for the location; and
causing intersecting semantic mapping data of the first and second electronic devices that intersects with one another in an intersecting location shared between the first and second electronic devices within the location indicated in the request to be identified, using a private set intersection protocol, from respective semantic mapping data of the first and second electronic devices, wherein for the intersecting location, performance of the semantic mapping process is based on the identification, wherein sources of intersecting semantic mapping data of the first and second electronic devices are to be known to both participating electronic devices of the semantic mapping process, wherein the intersecting semantic mapping data of the first electronic device is provided to the second electronic device under cleartext, and wherein for an area within the location but outside of the intersecting location, access to semantic mapping data of the first electronic device corresponding to the area is allowed but access to source information of the semantic mapping data of the first electronic device corresponding to the area by the second electronic device is blocked.

* * * * *